US011950047B2

(12) United States Patent
Corynen

(10) Patent No.: US 11,950,047 B2
(45) Date of Patent: Apr. 2, 2024

(54) LOUDSPEAKER

(71) Applicant: PSS BELGIUM NV, Dendermonde (BE)

(72) Inventor: David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 206 days.

(21) Appl. No.: 17/611,648

(22) PCT Filed: May 19, 2020

(86) PCT No.: PCT/EP2020/064002

§ 371 (c)(1),
(2) Date: Nov. 16, 2021

(87) PCT Pub. No.: WO2020/234316

PCT Pub. Date: Nov. 26, 2020

(65) Prior Publication Data

US 2022/0201385 A1 Jun. 23, 2022

(30) Foreign Application Priority Data

May 23, 2019 (GB) .................................... 1907267

(51) Int. Cl.
*H04R 7/20* (2006.01)
*H04R 1/02* (2006.01)
(Continued)

(52) U.S. Cl.
CPC ........... *H04R 1/2819* (2013.01); *H04R 1/028* (2013.01); *H04R 1/06* (2013.01); *H04R 1/288* (2013.01);
(Continued)

(58) Field of Classification Search
CPC .......... H04R 1/2819; H04R 1/06; H04R 7/04; H04R 7/06; H04R 7/18; H04R 9/06; H04R 7/20; H04R 2400/11; H04R 2307/00
(Continued)

(56) References Cited

U.S. PATENT DOCUMENTS 4,354,067 A * 10/1982 Yamada ................ H04R 9/047
381/301
5,251,188 A * 10/1993 Parsons ................. G10K 9/122
181/173
(Continued)

FOREIGN PATENT DOCUMENTS

CN 101523929 A 9/2009
CN 106576207 A 4/2017
(Continued)

OTHER PUBLICATIONS

ISA/EP, International Search Report and Written Opinion for corresponding PCT Patent Application No. PCT/EP2020/064002, dated Jul. 10, 2020, 8 pages.
(Continued)

*Primary Examiner* — Disler Paul
(74) *Attorney, Agent, or Firm* — NK Patent Law

(57) ABSTRACT

A loudspeaker for producing sound at bass frequencies including: a diaphragm; a frame, wherein a proximal end of the diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm; a drive unit configured to move the distal end of the diaphragm based on an electrical signal.

14 Claims, 19 Drawing Sheets

(51) Int. Cl.

| | |
|---|---|
| ***H04R 1/06*** | (2006.01) |
| ***H04R 1/28*** | (2006.01) |
| ***H04R 7/04*** | (2006.01) |
| ***H04R 7/06*** | (2006.01) |
| ***H04R 7/18*** | (2006.01) |
| ***H04R 9/06*** | (2006.01) |

(52) U.S. Cl.
CPC ................. *H04R 7/04* (2013.01); *H04R 7/06* (2013.01); *H04R 7/18* (2013.01); *H04R 9/06* (2013.01); *H04R 2307/00* (2013.01); *H04R 2400/11* (2013.01)

(58) Field of Classification Search
USPC .......................................................... 381/333
See application file for complete search history.

(56) References Cited

U.S. PATENT DOCUMENTS

| | | | | |
|---|---|---|---|---|
| 5,317,642 | A | 5/1994 | Danley et al. | |
| 5,887,071 | A | 3/1999 | House | |
| 10,993,043 | B2 * | 4/2021 | Lee | H04R 1/04 |
| 10,999,673 | B2 * | 5/2021 | Cho | H04R 9/06 |
| 11,171,621 | B2 * | 11/2021 | Noertker | H04R 29/001 |
| 11,388,523 | B2 * | 7/2022 | Corynen | H04R 9/043 |
| 11,716,563 | B2 * | 8/2023 | Zastoupil | H04R 1/2834 381/345 |
| 2005/0111688 | A1 | 5/2005 | Wilmink et al. | |
| 2006/0198541 | A1 | 9/2006 | Henry | |
| 2008/0247595 | A1 | 10/2008 | Henry | |

FOREIGN PATENT DOCUMENTS

| | | | |
|---|---|---|---|
| EP | 1974584 | A2 | 10/2008 |
| EP | 2928207 | A1 | 10/2015 |
| GB | 2393602 | A | 3/2004 |
| WO | 9806232 | A1 | 2/1998 |
| WO | 03001841 | A2 | 1/2003 |
| WO | 2005041616 | A1 | 5/2005 |
| WO | 2019121266 | A1 | 6/2019 |
| WO | 2019192808 | A1 | 10/2019 |
| WO | 2019192816 | A1 | 10/2019 |

OTHER PUBLICATIONS

CNIPA, Office Action for corresponding Chinese Patent Application No. 202080038088X, dated Nov. 14, 2023, 26 pages.

* cited by examiner

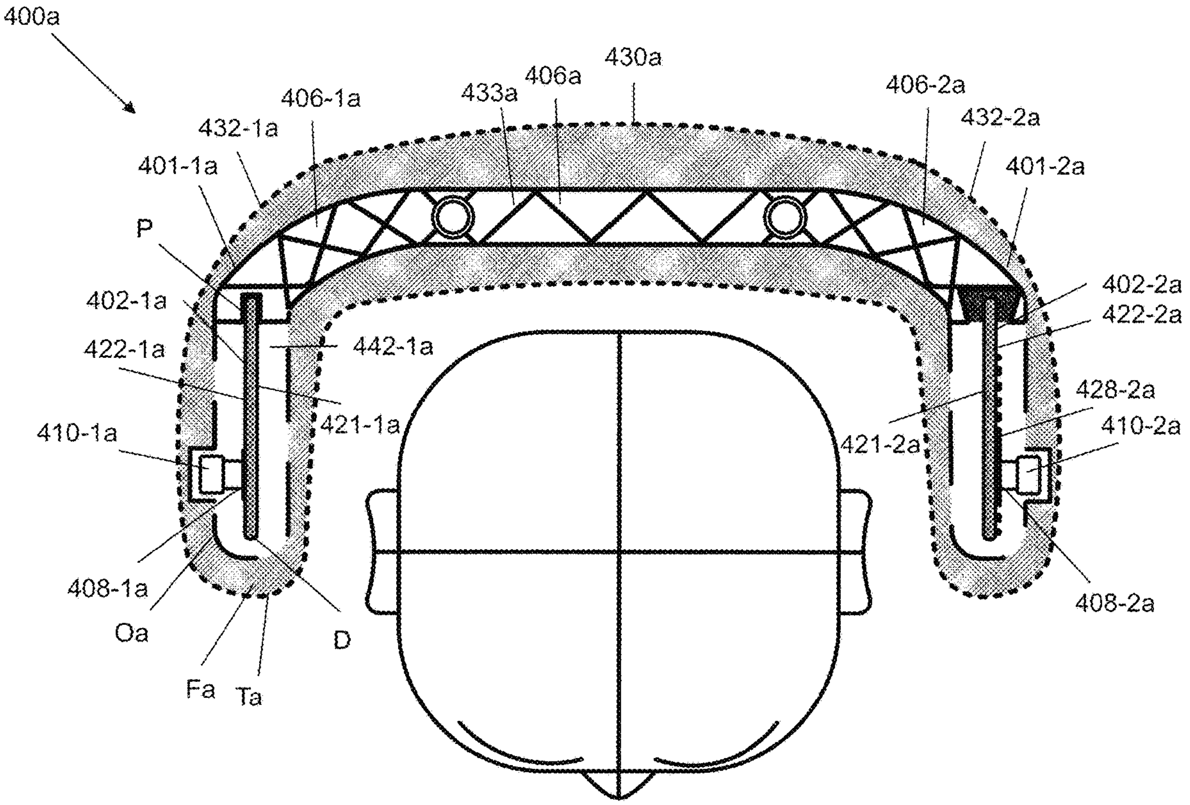
Fig. 14A(i)
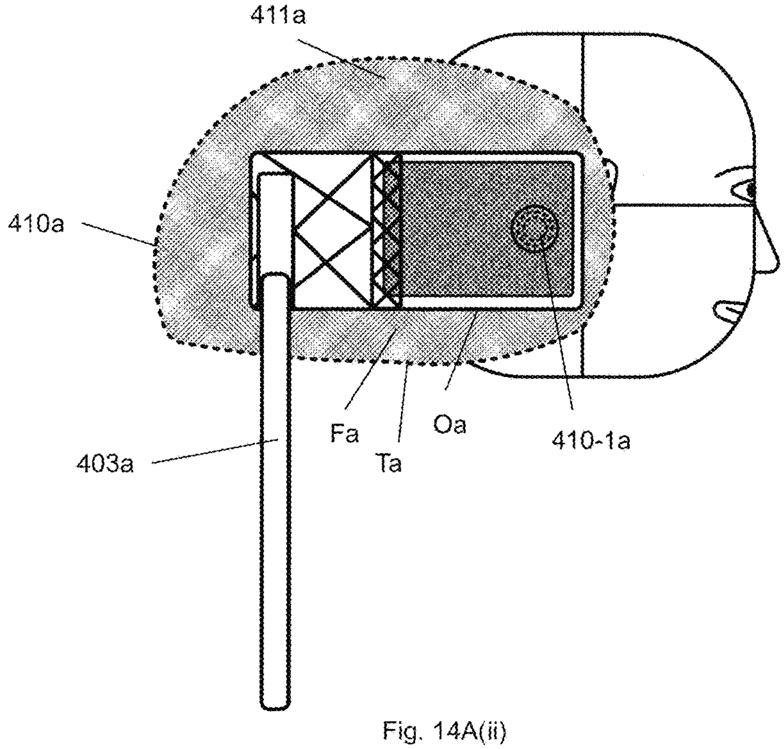
Fig. 14A(ii)

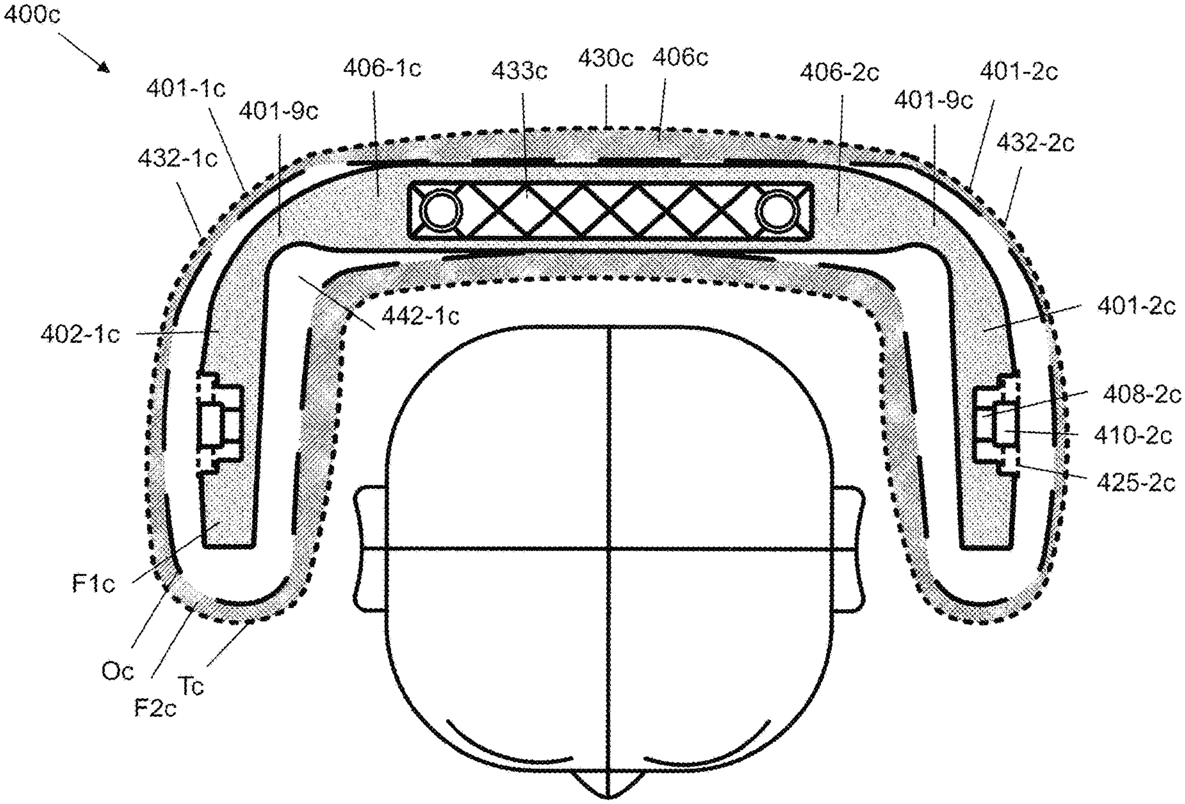
Fig. 14C(i)
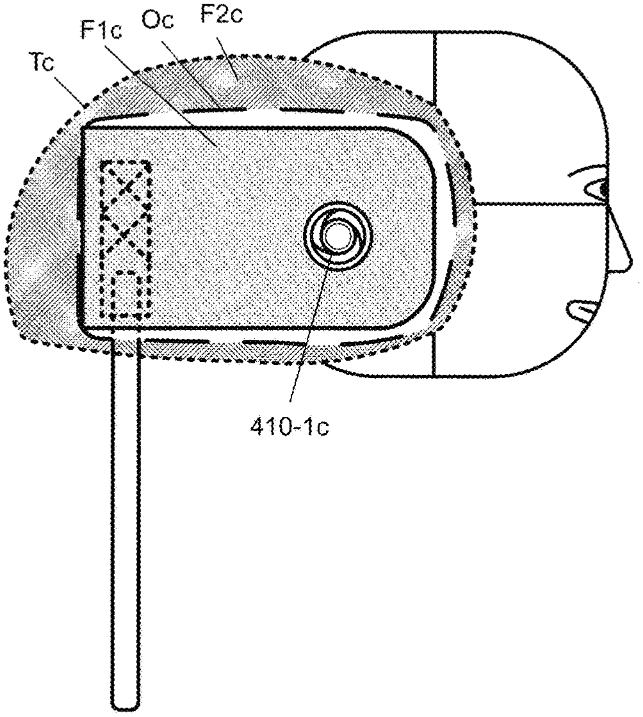
Fig. 14C(ii)

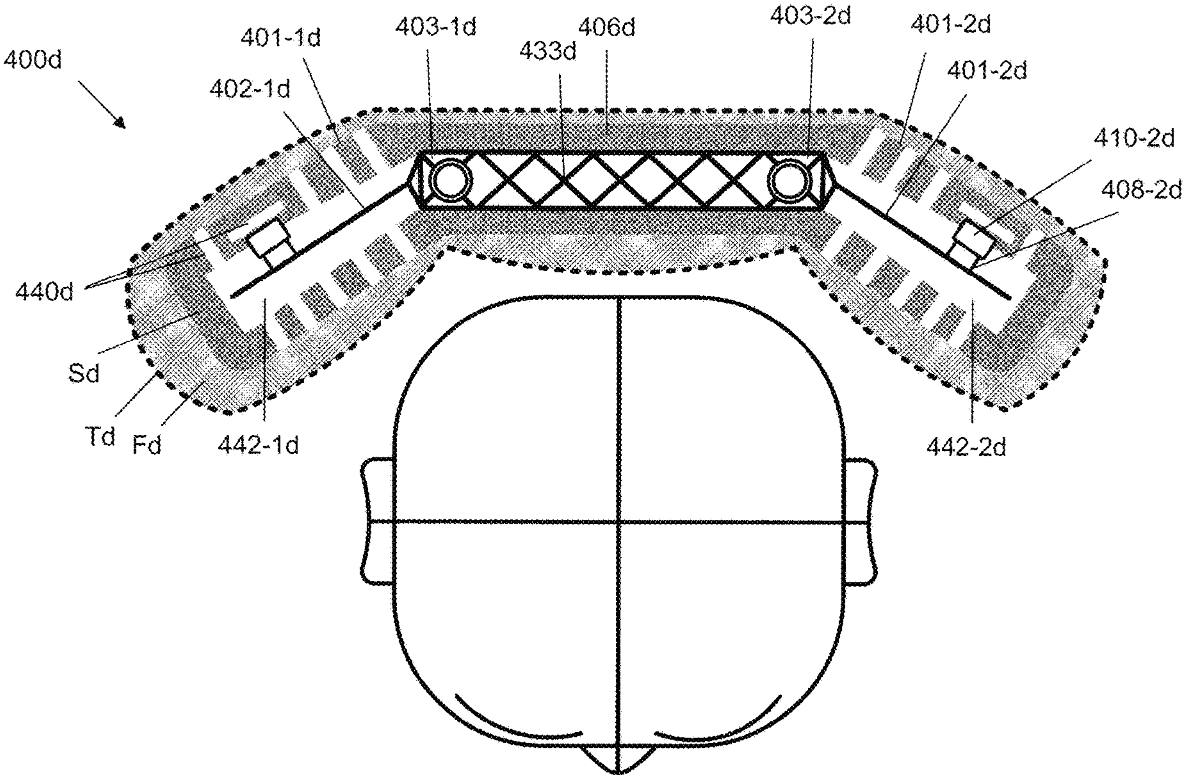
Fig. 14D(i)
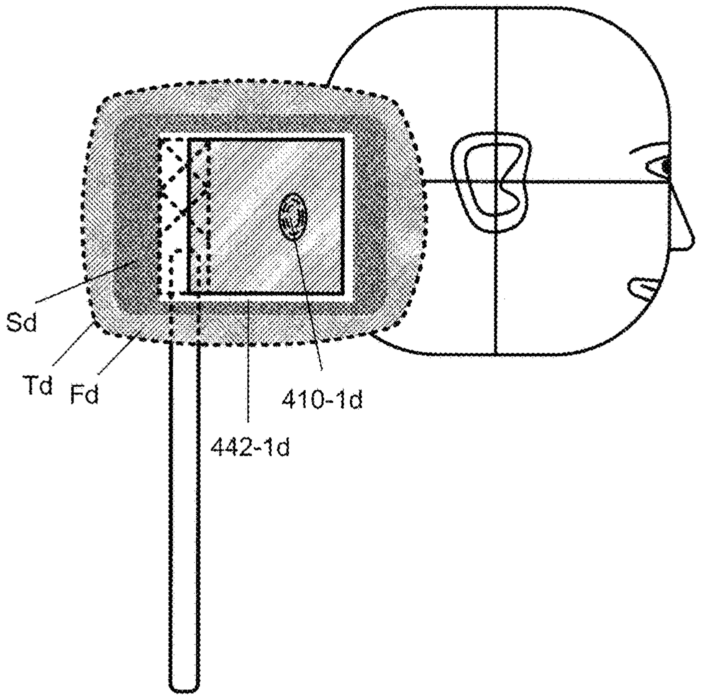
Fig. 14D(ii)

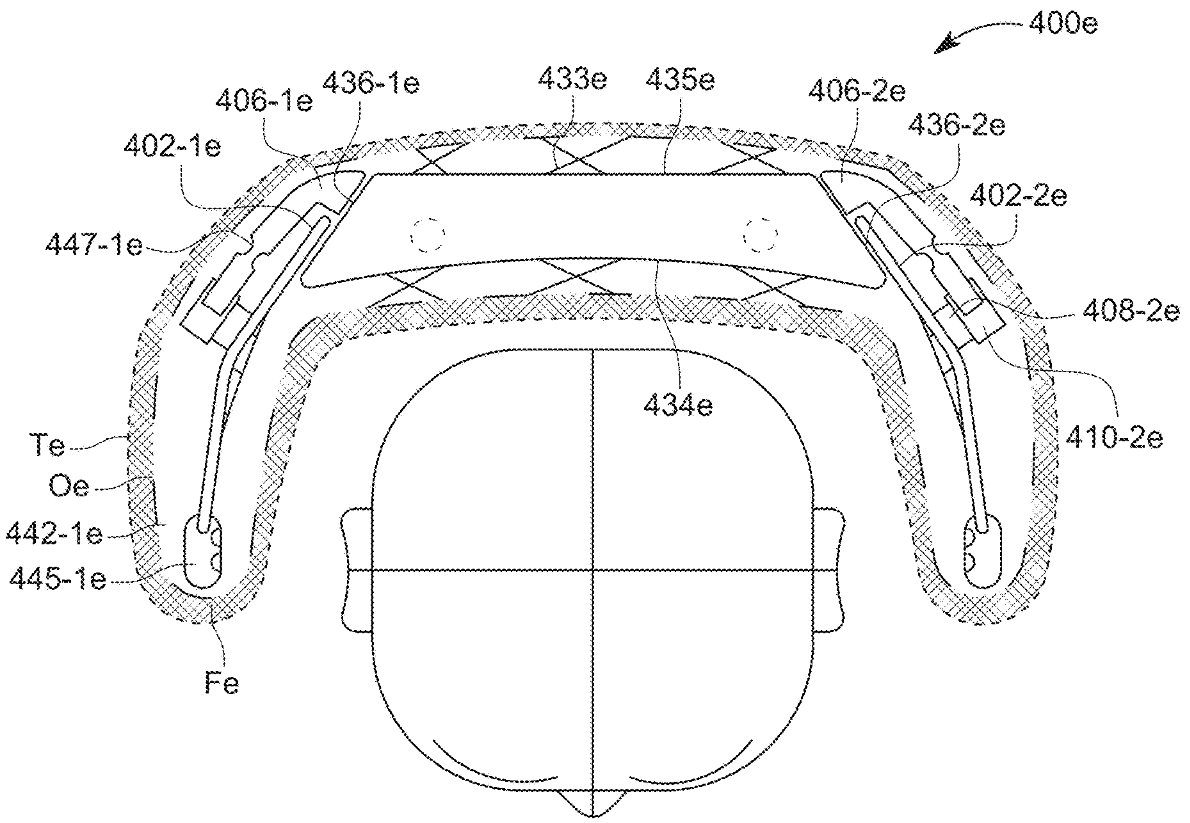
FIG. 14E(i)
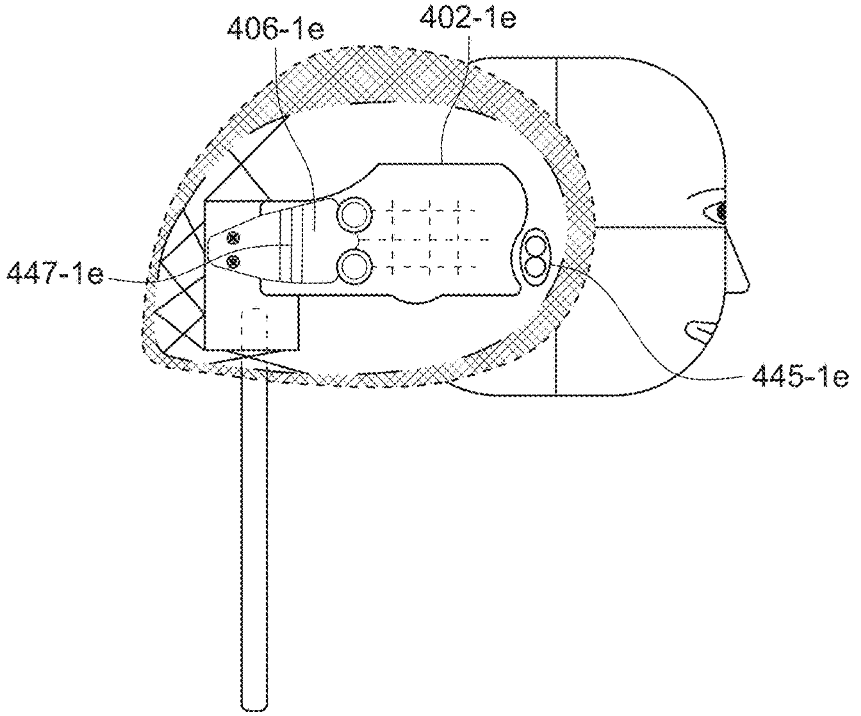
FIG. 14E(ii)

LOUDSPEAKER

CROSS REFERENCE TO RELATED APPLICATIONS

This application is a U.S. National Stage Application of International Patent Application No. PCT/EP2020/064002 entitled "LOUDSPEAKER" filed 19 May 2020, which claims priority from United Kingdom Patent Application No. 1907267.7 entitled "LOUDSPEAKER" filed 23 May 2019, the entire contents and elements of all of which are herein incorporated by reference for all purposes.

FIELD OF THE INVENTION

The present invention relates to a loudspeaker for producing sound at bass frequencies.

BACKGROUND

Loudspeakers for producing sound at bass frequencies are well known.

Among the frequencies in the audible spectrum, lower frequencies are the ones that tend to carry most well over larger distances and are the ones difficult to keep inside a room. For example, nuisance from neighboring loud music has mostly a low frequency spectrum. "Low" frequencies can also be referred to as "bass" frequencies and these terms may be used interchangeably throughout this document.

Many cars today are equipped with a main audio system, which typically consists of a central user interface console with internal or external audio amplifiers, and one or more loudspeakers placed in the doors. This type of audio system is used to ensure enough loudness of the same content (e.g. radio or cd-playback) for all passengers.

Some cars include personal entertainment systems (music, games & television) which are typically equipped with headphones to ensure individual passengers receive personalized sound, without disturbing (or being disturbed by) other passengers who are enjoining a different audio-visual content.

Some cars include loudspeakers placed very close to an individual passenger, so that sound having an adequately high sound pressure level ("SPL") can be obtained at the ears of that individual passenger, whilst having a much lower SPL at the positions of other passengers.

The present inventor has observed that the concept of a personal sound cocoon is a useful way to understand the approach of having a loudspeaker placed close to a user, wherein the personal sound cocoon is a region in which a user is able to experience sound having an SPL deemed to be acceptably high for their enjoyment, whereas outside the personal sound cocoon the sound is deemed to have an SPL which is lower than it is within the personal sound cocoon.

PCT/EP2018/084636, PCT/EP2019/056109 and PCT/EP2019/056352 all filed by the present applicant, are directed to loudspeakers intended for use in creating a personal sound cocoon, with an ear of a user being very close (e.g. 20 cm or less) from a diaphragm or sound outlet of the loudspeaker.

In loudspeakers intended to be used at close distance to an ear of a user (e.g. for creating a personal sound cocoon), rub and buzz and harmonic distortion are preferably kept to inaudible levels in order to not disturb the listening experience inside the 'cocoon' and also to increase the size of the cocoon.

Loudspeakers incorporating traditional roll suspensions and/or spider suspensions need to be carefully designed to achieve a inaudible rub and buzz and harmonic distortion at close distances from a user, especially if they are to make significant levels of excursion (e.g. between 10 mm or more, or 20 mm or more in normal use).

Also, a roll suspension surrounding a diaphragm requires a frame extending around the diaphragm, occupying space that cannot serve as an effective radiating surface. Moreover, if the loudspeaker is configured as a dipole loudspeaker (as in PCT/EP2018/084636 and PCT/EP2019/056109, for example), a roll suspension will act as a baffle for the dipole loudspeaker which may worsen the effectiveness of the personal sound cocoon (since this increases path length for sound, which can worsen cocooning, see PCT/EP2018/084636 and PCT/EP2019/056109 for details).

For loudspeakers which are to be incorporated into a headrest, the space availability in a headrest is limited and in many cases is shared with other equipment (e.g. height adjustment mechanism), so smart integration of silent operating loudspeakers capable of moving air volume is required.

For a loudspeaker to operate as a subwoofer, the loudspeaker needs to be able to operate over a bass frequency range of 40 Hz to 150 Hz. The loudspeaker may need to operate over an additional frequency range of 100 Hz to 500 Hz if the loudspeaker is to be used with traditional mid-high frequency units (which typically operate at 500 Hz or higher).

The present invention has been devised in light of the above considerations.

SUMMARY OF THE INVENTION

A first aspect of the invention provides:

A loudspeaker for producing sound at bass frequencies including:

a diaphragm;

a frame, wherein a proximal end of the diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm;

a drive unit configured to move the distal end of the diaphragm based on an electrical signal.

The present inventor has found that such a loudspeaker is well suited to providing sound in close proximity to an ear of a user (e.g. for the purpose of creating a personal sound cocoon), since it is well suited to reducing rub and buzz harmonic distortion as well as providing dipole-like performance.

The diaphragm of the loudspeaker may have a first radiating surface and a second radiating surface, wherein the first radiating surface and the second radiating surface are located on opposite faces of the diaphragm.

The frame may be configured to allow sound produced by the first radiating surfaces to propagate out from a first side of the loudspeaker in the first direction and to allow sound produced by the second radiating surfaces to propagate out from a second side of the loudspeaker in the second direction, e.g. so that the loudspeaker exhibits dipole like behaviour. A skilled person would appreciate this to mean that the frame should be adequately open to mostly avoid getting in the way of sound produced by the first and second radiating surfaces, so that sound produced by the first and second radiating surfaces is able interfere with each other without being overly inhibited or guided by the frame (or elements mounted to the frame). A skilled person would appreciate that the extent to which the frame is open at the first and second sides of the loudspeaker will depend on a number of factors such as the level of personal sound cocooning desired, the size of personal sound cocoon desired, and other design considerations (e.g. implementing the loudspeaker in a car headrest may require some of the frame or other structure to be located in front of the first and/or second radiating surfaces). Accordingly, the degree to which the frame should be open at the first and second sides of the loudspeaker to achieve a desired level of personal sound cocooning cannot readily be defined in a precise manner.

A loudspeaker according to the first aspect of the invention may be configured for use with an ear of a user located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm.

For reasons explained in PCT/EP2018/084636 and PCT/EP2019/056109, if sound produced by the first and second radiating surfaces of the loudspeaker is able to propagate out from the loudspeaker, then a user with an ear that is in front of and close to (e.g. 50 cm or less from) a first radiating surface of the diaphragm will preferably hear the sound produced by that first radiating surface, but a user who is further away from that first radiating surface will preferably hear sound with a greatly reduced SPL level at low frequencies, it is believed due to interference from out of phase sound produced by the second radiating surface of the diaphragm. Thus, in such a configuration, a user is able to experience an effective personal sound cocoon at low frequencies.

Here it is to be noted that although the listening position has been defined with respect to the first radiating surface of the diaphragm, this does not rule out the possibility of a similar "proximity" effect being achievable at another listening position. Indeed, it is expected that a similar effect could be achieved with respect to the second radiating surface of the diaphragm.

The distal end of the diaphragm may be suspended from the frame by at least one distal suspension element, wherein the at least one distal suspension element is configured to permit translational movement of a distal end of the diaphragm. The distal suspension element may be a roll suspension, for example.

The at least one proximal suspension element may be configured to prevent rotation of the proximal end of the diaphragm, in which case the diaphragm may be referred to herein as a "cantilever diaphragm". For example, the proximal suspension element may be a clamp which clamps to the proximal end of the diaphragm to the frame, as in the "Type 1" loudspeaker discussed below.

The at least one proximal suspension element may be configured to permit rotation of the proximal end of the diaphragm, in which case the diaphragm may be referred to herein as a "hinged diaphragm". For example, the proximal suspension element may be integral with the diaphragm as in the "Type 2" loudspeaker discussed below, integral with the frame as in the "Type 3" loudspeaker discussed below, or a separate element attached to the frame as in the "Type 4" loudspeaker discussed below.

Preferably, the drive unit is configured to apply force to the diaphragm at a location on the diaphragm that corresponds to a node in the second harmonic mode of the diaphragm, e.g. by having the voice coil attached to the diaphragm at this location.

This location may be calculated according to mode analysis using finite element modelling, for example.

By applying force at this location on the diaphragm, the second harmonic mode of the diaphragm can be suppressed, thereby allowing the loudspeaker to be used at the frequency of the second harmonic mode, thereby significantly extending the range over which the loudspeaker can be used without problematic distortion.

The drive unit may be an electromagnetic drive unit that includes a magnet unit configured to produce a magnetic field in an air gap, and a voice coil attached to the diaphragm. In use, the voice coil may be energized (have a current passed through it) to produce a magnetic field which interacts with the magnetic field produced by the magnet unit and which causes the voice coil (and therefore the diaphragm) to move relative to the magnet unit. The magnet unit may include a permanent magnet. The voice coil may be configured to sit in the air gap when the diaphragm is at rest. Such drive units are well known.

The diaphragm may be a primary diaphragm, wherein a secondary diaphragm is suspended from the primary diaphragm by one or more secondary suspension elements.

In this way, the frequency range of the loudspeaker can be extended significantly, e.g. with the primary diaphragm being configured to be dominant in producing sound at relatively low frequencies (e.g. bass frequencies) and the secondary diaphragm being configured to be dominant in producing sound at higher frequencies.

Preferably, the drive unit is configured to move the distal end of the diaphragm (based on the electrical signal) by applying force at the secondary diaphragm. For example, the voice coil may be directly attached to the secondary diaphragm, and would thus be attached to the primary diaphragm via the secondary diaphragm.

By way of example, the secondary diaphragm may be integrally formed (e.g. cut out from) the primary diaphragm, wherein a region (e.g. an uncut region) of the primary diaphragm provides the secondary suspension element which suspends the secondary diaphragm from the primary diaphragm.

Preferably, the loudspeaker may be configured to produce sound at bass frequencies, wherein the bass frequencies preferably include frequencies across the range 60-80 Hz, more preferably frequencies across the range 50-100 Hz, more preferably frequencies across the range 40-100 Hz, and may include frequencies across the range 40-160 Hz.

The loudspeaker may thus be a subwoofer.

In some embodiments, the loudspeaker may be configured to produce sound over a more extended frequency range, e.g. including frequencies across the range 50 Hz-500 Hz, 50 Hz-1000 Hz, or even 50 Hz-20 kHz. This may be achieved by one of the techniques referred to above, e.g. through the drive unit being configured to apply force to the diaphragm at a location on the diaphragm that corresponds to a node in the second harmonic mode of the diaphragm and/or by a secondary diaphragm being suspended from the primary diaphragm by one or more secondary suspension elements.

In some embodiments, the distal end of the diaphragm may be configured to have an excursion (distance measured along a longitudinal axis of the loudspeaker) between a location of the diaphragm when the diaphragm is at its maximum extent in a forwards direction and that location when the diaphragm is at its maximum extent in the opposite direction, (wherein the longitudinal axis is parallel to a direction in which the diaphragm is moved by the drive unit) of 10 mm or more, or even 20 mm or more when the loudspeaker is in normal use.

In some embodiments, the diaphragm may have a non-circular shape, e.g. a rectangular or square shape. This may help to maximize the surface area of the first and second radiating surfaces within other design constraints (e.g. incorporating the loudspeaker into a car headrest).

In some embodiments, a magnet unit of the drive unit may be attached to (e.g. suspended from) a portion of the frame.

Preferably, a magnet unit of the drive unit is suspended from the frame by at least one magnet unit suspension element. The at least one magnet unit suspension element may be a roll suspension. The at least one magnet unit suspension element may include a corrugation or weakened region in the frame (in this case, the portion of the frame that connects the corrugation or weakened region in the frame to the magnet unit can be considered as part of the at least one magnet unit suspension element). If the at least one magnet unit suspension element includes a corrugation or weakened region in the frame, the proximal end of the diaphragm is preferably suspended from a part of the frame from which the magnet unit is suspended.

The at least one magnet unit suspension element is preferably configured (e.g. tuned) to provide a predetermined level of attenuation on vibrations produced by the drive unit before those vibrations reach the frame. For example, the at least one magnet unit suspension element may be tuned to attenuate vibrations produced by the drive unit in some predetermined frequency range, before those vibrations reach the frame.

In some embodiments, a magnet unit of the drive unit may be suspended from the diaphragm via at least one magnet unit suspension element, e.g. as in the "Type 3" loudspeaker discussed below.

In some embodiments, the loudspeaker may be configured for use in performing noise cancelation, e.g. at bass frequencies. For example, drive circuitry of the loudspeaker may be configured to provide the diaphragm with an electrical signal configured to move the diaphragm so that the first radiating surface of the diaphragm produces sound configured to cancel environmental sound at a listening position, wherein one or more microphones are configured to detect the environmental sound.

For avoidance of any doubt, the loudspeaker according to the first aspect of the invention may be configured to be used as or in a dipole loudspeaker as set out in PCT/EP2018/084636, a loudspeaker unit as set out in PCT/EP2019/056109, or a loudspeaker unit as set out in PCT/EP2019/056352. The loudspeakers and loudspeaker units described in these applications all require a diaphragm suspended from a frame, and since the loudspeaker according to the first aspect of the invention also requires a diaphragm suspended from a frame (by at least one proximal suspension element), the loudspeaker according to the first aspect of the invention is thus compatible for use in the loudspeaker and loudspeaker units of PCT/EP2018/084636, PCT/EP2019/056109, and PCT/EP2019/056352.

In a second aspect, the present invention may provide a seat assembly including a seat and a loudspeaker according to the first aspect of the invention.

Preferably, the seat is configured to position a user who is sat down in the seat such that an ear of the user is located at a listening position as described above, e.g. a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm.

The loudspeaker may be mounted within a headrest of the seat ("seat headrest"). Since a typical headrest is configured to be a small distance (e.g. 30 cm or less) from the ears of a user who is sat down in a seat, this is a particularly convenient way of configuring the seat to position a user who is sat down in the seat such that an ear of the user is located at a listening position as described above.

The headrest of the seat may include a rear portion, configured to be located behind a head of a user sat in the seat, when the seat is in use.

The headrest of the seat may include a wing portion, configured to extend at least partially along a side of a head of a user sat in the seat, when the seat is in use.

The diaphragm may extend at least partially into the wing portion. The distal end of the diaphragm may be located in the wing portion.

The diaphragm may be curved, e.g. so as to follow a curvature of a user-facing surface of the headrest.

The headrest of the seat may include a first wing portion configured to extend at least partially along a first side of a head of a user sat in the seat, and a second wing portion configured to extend at least partially along a second side of the head of the user sat in the seat, when the seat is in use.

The headrest may include two loudspeakers according to the first aspect of the invention.

The seat may be configured to position a user who is sat down in the seat such that a first ear of the user is located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm of a first of the two loudspeakers, and such that a second ear of the user is located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm of a second of the two loudspeakers.

The diaphragm of a first of the two loudspeakers may extend at least partially into the first wing portion, and the diaphragm of a second of the two loudspeakers may extend at least partially into the second wing portion.

The seat may have a rigid seat frame. The frame of the loudspeaker may be part of or fixedly attached to the rigid seat frame.

The seat may be a vehicle seat, for use in a vehicle such as a car ("car seat") or an aeroplane ("plane seat").

The seat could be a seat for use outside of a vehicle. For example, the seat could be a seat for a computer game player, a seat for use in studio monitoring or home entertainment.

In a third aspect, the present invention may provide a vehicle (e.g. a car or an aeroplane) having a plurality of seat assemblies according to the second aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIGS. 14A(i) and 14A(ii) show a first example headrest incorporating a loudspeaker according to the present disclosure;

FIGS. 14C(i) and 14C(ii) show a third example headrest incorporating a loudspeaker according to the present disclosure;

FIGS. 14D(i) and 14D(ii) show a fourth example headrest incorporating a loudspeaker according to the present disclosure;

FIGS. 14E(i) and 14E(ii) show a fifth example headrest incorporating a loudspeaker according to the present disclosure;

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Reference herein to the "application" in relation to a given loudspeaker is intended to refer to an apparatus to which a loudspeaker described herein is rigidly connected. For example, if a loudspeaker is installed in a headrest of a car, the "application" may refer to the car headrest (or a car seat to which the car headrest is rigidly connected).

Preliminary Considerations

Figure 1A:
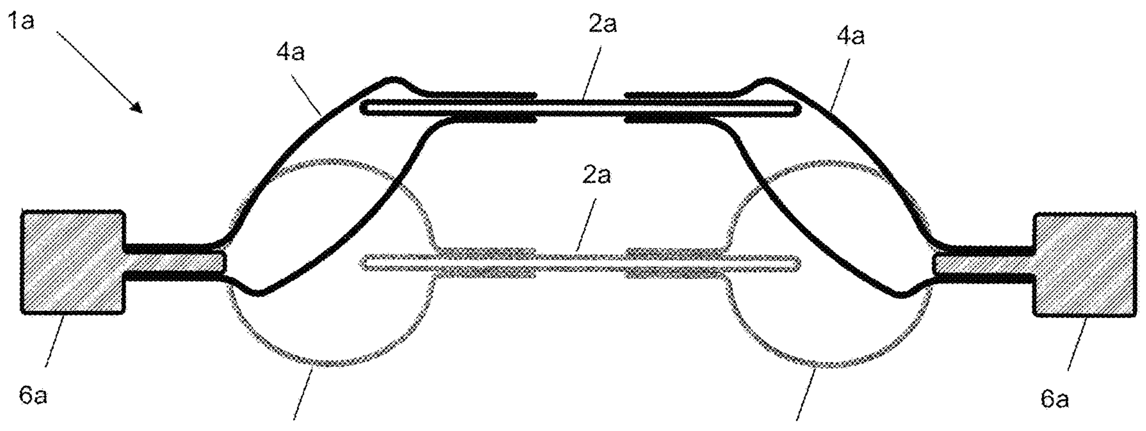
FIG. 1 compares A) a diaphragm suspended from a frame by two traditional roll suspensions with a diaphragm suspended from a frame at only its proximal end wherein B) the proximal end is prevented from pivoting (a "cantilever diaphragm") and C) the proximal end is permitted to pivot (a "hinged diaphragm")

FIG. 1A shows a diaphragm 2*a* suspended from a frame 6*a* by two traditional roll suspensions 4*a*, both when the diaphragm 2*a* is at rest (grey) and when the diaphragm 2*a* is at its maximum excursion (black).

Figure 1B:
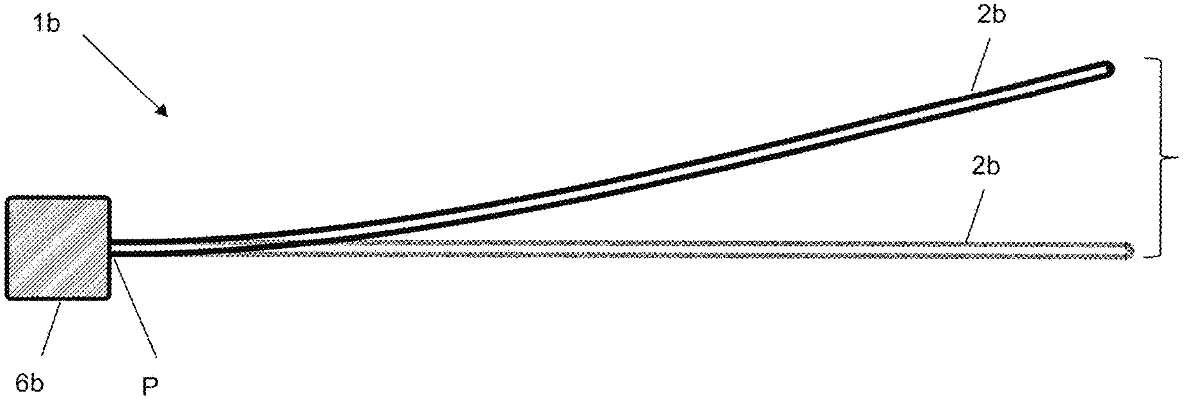

FIG. 1B shows a diaphragm 2*b* suspended from a frame 6*b* at only its proximal end P, so that translational movement of the proximal end P of the diaphragm 2*b* relative to the frame 6*b* is substantially prevented, whilst translational movement of a distal end D of the diaphragm 2*b* which is opposite to the proximal end P of the diaphragm 2*b* is permitted. The diaphragm 2*b* is shown both when the diaphragm 2*b* is at rest (grey) and when the diaphragm 2*b* is at its maximum excursion (black).

In this example, the proximal end P of the diaphragm 2*b* is prevented from pivoting. A diaphragm suspended in this way is referred to herein as a "cantilever diaphragm".

Note that a cantilever diaphragm does not require any roll suspension to allow stable diaphragm movement nor any spider to keep the voice coil in place relative to a magnet system. These two functions are now performed by the diaphragm itself (and the frame to which it is fixed).

Figure 1C:
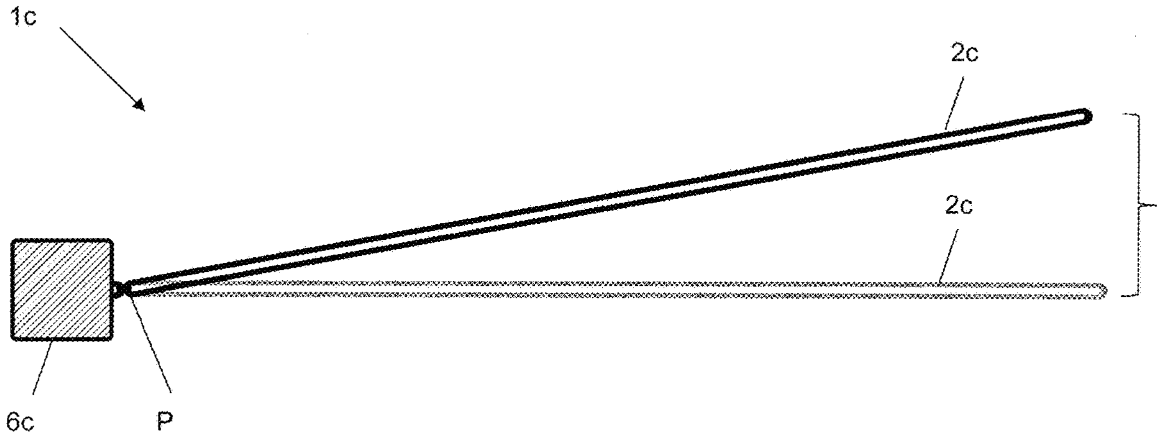

FIG. 1C shows a diaphragm 2*c* suspended from a frame 6*c* at only its proximal end P, so that translational movement of the proximal end P of the diaphragm 2*c* relative to the frame 6*c* is substantially prevented, whilst translational movement of a distal end D of the diaphragm 2*c* which is opposite to the proximal end P of the diaphragm 2*c* is permitted. The diaphragm 2*c* is shown both when the diaphragm 2*c* is at rest (grey) and when the diaphragm 2*c* is at its maximum excursion (black).

In this example, the proximal end P of the diaphragm 2*c* is permitted to pivot. A diaphragm suspended in this way is referred to herein as a "hinged diaphragm".

In a hinged diaphragm the compliance (Cm) is defined by the design of the hinge and is thus independent from the properties of the diaphragm, whereas with the cantilever Cm is integrally dependent from the diaphragm's mechanical properties. This gives more design freedom, e.g. for using a very stiff diaphragm capable of a wider frequency range (modes at higher frequencies).

For the cantilever diaphragm 2*b* and the hinged diaphragm 2*c*, the absence of any dampers/roll suspension helps to achieve silent operation.

The cantilever diaphragm 2*b* or hinged diaphragm 2*c* may be driven conventionally, e.g. with a voice-coil rigidly attached to the diaphragm, and located in an air gap of a magnet unit. However, when driving the cantilever diaphragm 2*b* or hinged diaphragm 2*c* conventionally the air gap of the magnet unit should be larger as compared to a traditional electrodynamic loudspeaker, due to rotational movement of the voice coil (rigidly attached to the diaphragm) relative to the magnet unit. This will contribute further to a silent operation of the drive unit as well since no air compression effects (blowing noises) will occur.

Figure 2:
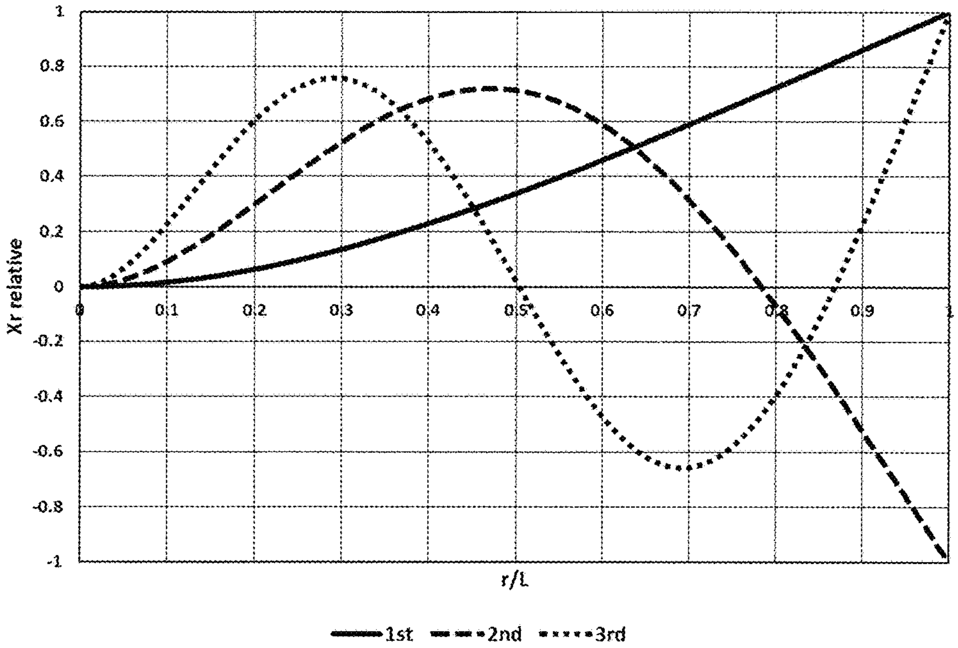
FIG. 2 illustrates cantilever mode shapes for the first harmonic (labelled '1st'), the second harmonic (labelled '2nd') and third harmonic (labelled '3rd') of the cantilever diaphragm shown in FIG. 1B.

FIG. 2 illustrates cantilever mode shapes for the first harmonic (labelled '1st'), the second harmonic (labelled '2nd') and third harmonic (labelled '3rd') of the cantilever diaphragm 2*b* shown in FIG. 1B, where Xr is displacement of the diaphragm 2*b* relative to a rest position of the diaphragm 2*b*, *r* is distance from the proximal end P of the diaphragm 2*b* from which the diaphragm 2*b* is suspended, and L is the length of the diaphragm 2*b*.

The frequency of the fundamental (first harmonic) mode of the cantilever diaphragm (f1) is given by:

$$f1 = 0.162 \cdot \frac{t}{l^2}\sqrt{\frac{E}{\rho}} \quad (1)$$

Where E=Youngs modulus [Pa], ρ=density [kg/m$^3$], t=thickness [m], l=length [m]. The frequency of the second harmonic mode of the cantilever diaphragm (f2) is given by:

$$f2 = 6.27 \cdot f1$$

The frequency of the third harmonic mode of the cantilever diaphragm (f3) is given by:

$$f3 = 17.55 \cdot f1$$

Figure 3:
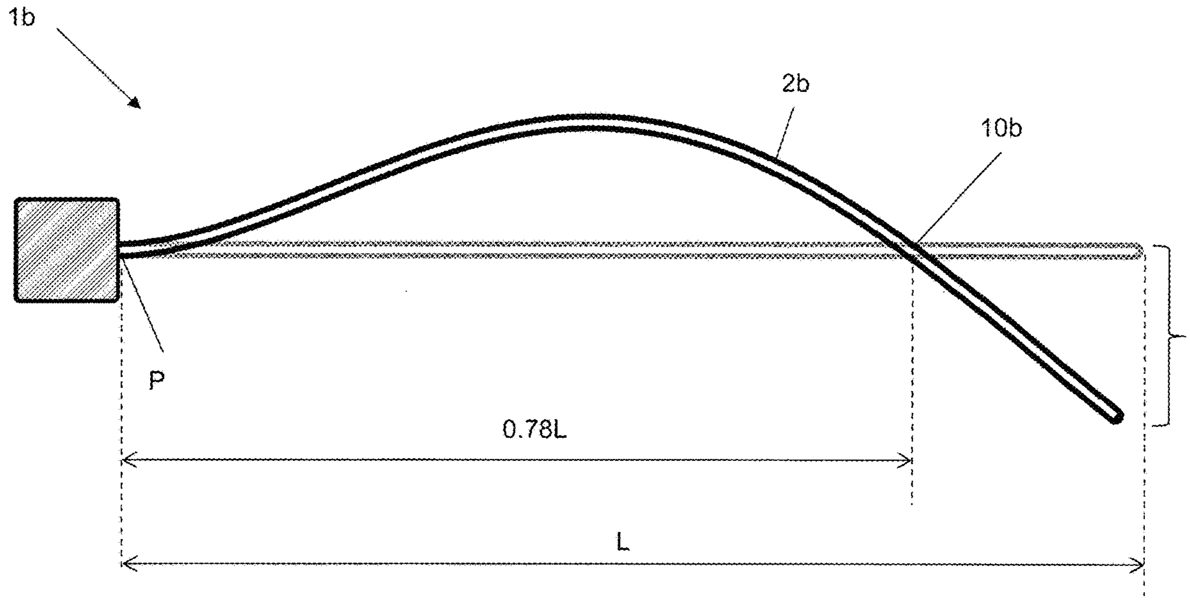
FIG. 3 illustrates the node of the second harmonic mode of the cantilever diaphragm shown in FIG. 1B.

The second harmonic mode occurs at a frequency (f2) that is 6.27 times the frequency of the fundamental harmonic mode (f1). As illustrated in FIG. 3, this second harmonic mode has a node 10*b* situated at a distance of 0.78 L from the proximal end P of the diaphragm 2*b*. Note that in this second harmonic mode, a distal region of the diaphragm (that lies on the opposite side of the node 10*b* from the proximal end P of the diaphragm 2*b*) moves out of phase relative to a proximal region of the diaphragm (that lies on the same side of the node 10*b* as the proximal end P of the diaphragm).

The present inventor has observed that to extend the frequency range at which the diaphragm 2*b* can move completely in phase, thereby helping to maximise volume displacement, the second mode can be suppressed by driving the diaphragm 2*b* at the location of the node 10*b* in the second harmonic mode of the diaphragm 2*b*, i.e. at the node 10*b* as shown in FIG. 3. This is because driving the diaphragm 2*b* at the node 10 avoids energy being given to the second harmonic mode of the diaphragm 2*b* (since the second harmonic mode of the diaphragm 2*b* requires this location to be at rest).

Thus, by driving the diaphragm 2*b* at the location of the node 10*b* in the second harmonic mode of the diaphragm 2*b*, the useful frequency range of the cantilever diaphragm 2*b* over which harmonic modes can be avoided is extended from f1 to f2 (f1 to 6.27.f1), to f1 to f3 (f1 to 17.55.f1).

By way of example, consider a clamped (cantilever) diaphragm 2*b* having a fundamental harmonic mode frequency (f1) of 20 Hz. For this diaphragm 2*b*, the frequency of the second harmonic mode (f2) will be 6.27.f1=125 Hz, and the frequency of the third harmonic mode (f3) will be 17.55.f1=350 Hz.

Regardless of where the diaphragm 2*b* is driven, this diaphragm 2*b* can be driven over a frequency span of f1=20 Hz (actually a little over 20 Hz) to f2=125 Hz (actually, a little under 125 Hz) without being distorted by harmonic modes, a frequency range that is useful for a personal subwoofer.

However, if this diaphragm 2*b* were to be driven at the location of the node 10*b* in the second harmonic mode of the diaphragm 2*b*, then the second harmonic mode would be suppressed, and the diaphragm 2*b* can be driven over a frequency span of f1=20 Hz (actually a little over 20 Hz) to f3=350 Hz (actually, a little under 350 Hz) without being distorted by harmonic modes, a frequency range that starts to extend into the mid-range.

Note that the exact location of the node 10*b* in the second harmonic mode of the diaphragm 2*b* for more complex shaped diaphragms (e.g. curved in length or width direction, thickness variation across the diaphragm, laminated structures, variated stiffness distributed, anisotropy, etc.) can be retrieved by experiment and/or by performing a mode analysis with the help of Finite Element Modeling.

Figure 4A:
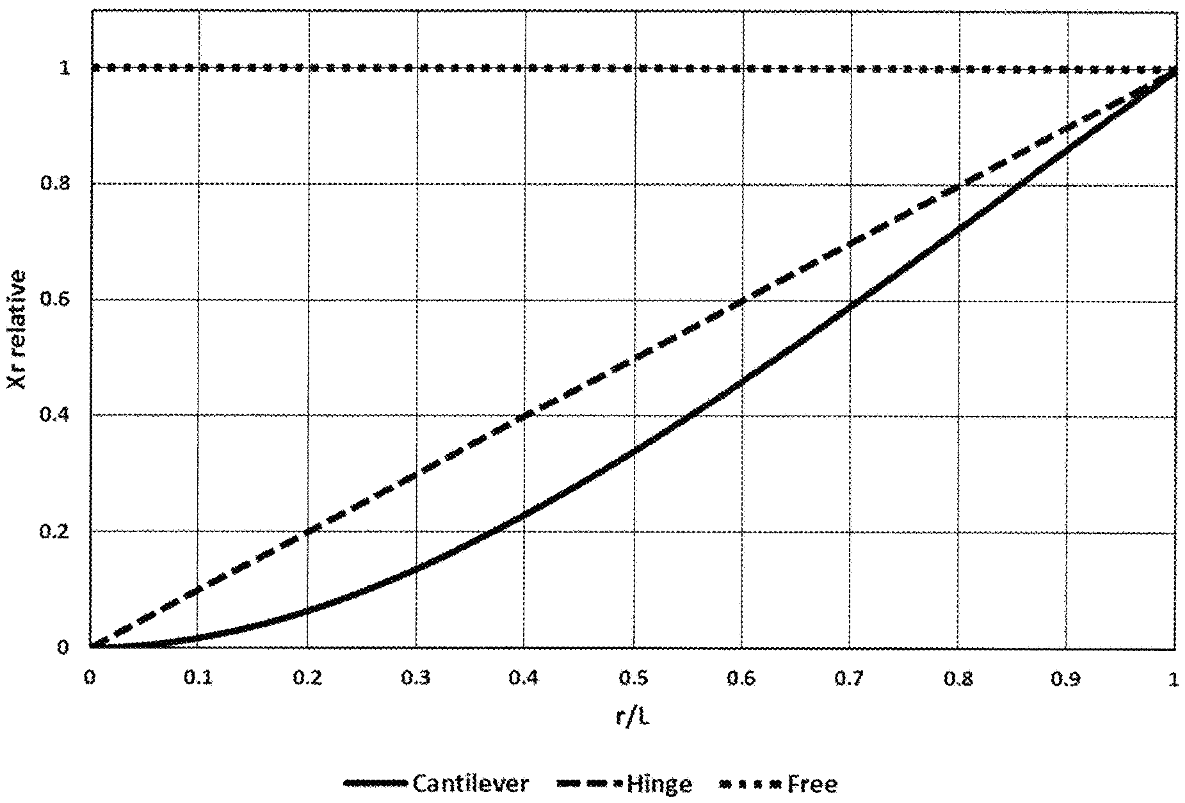
FIG. 4 illustrate A) a displacement comparison for fundamental harmonic modes for B) a free diaphragm, C) a hinged diaphragm, and D) a cantilever diaphragm.
Figure 4B:
Figure 4C:
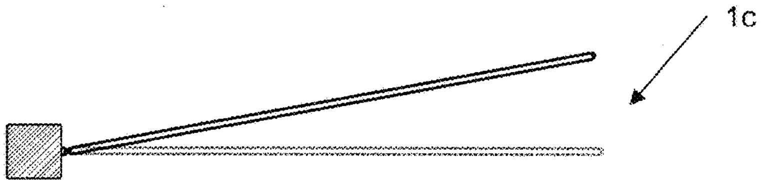
Figure 4D:
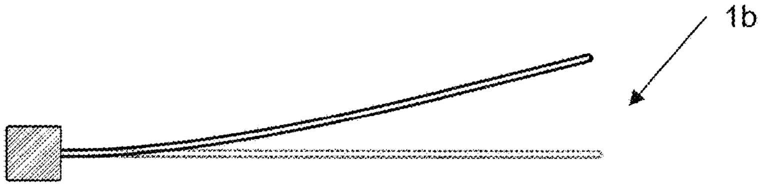

FIG. 4A illustrates a displacement comparison for fundamental harmonic modes for a free diaphragm (as shown in FIG. 4B), a hinged diaphragm (as shown in FIG. 4C), and a cantilever diaphragm (as shown in FIG. 4D).

The air volume displacement of these arrangements for a rectangular diaphragm having the same size and shape is 1:0.5:0.4 (free:hinged:cantilever).

Example Loudspeaker Types

Figure 5A:
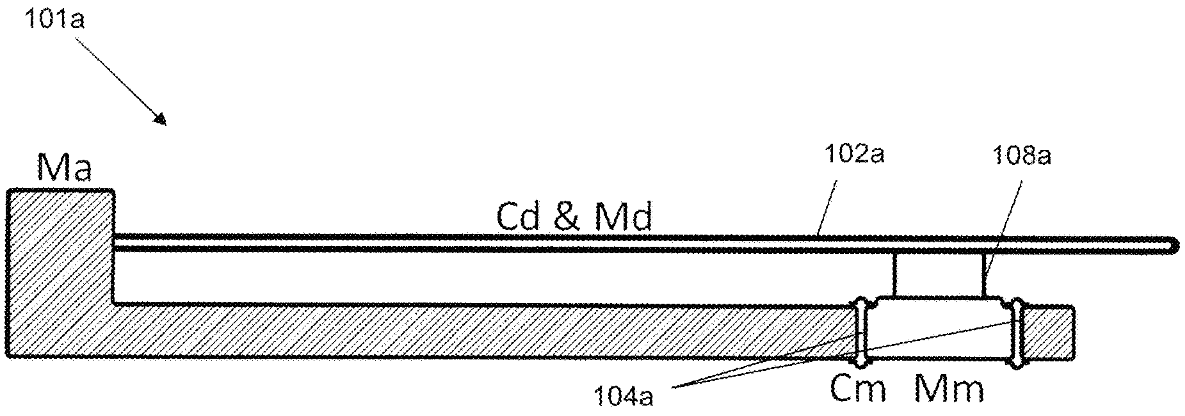
FIGS. 5A and 5B illustrate a 'Type 1' loudspeaker according to the present disclosure.
Figure 5B:
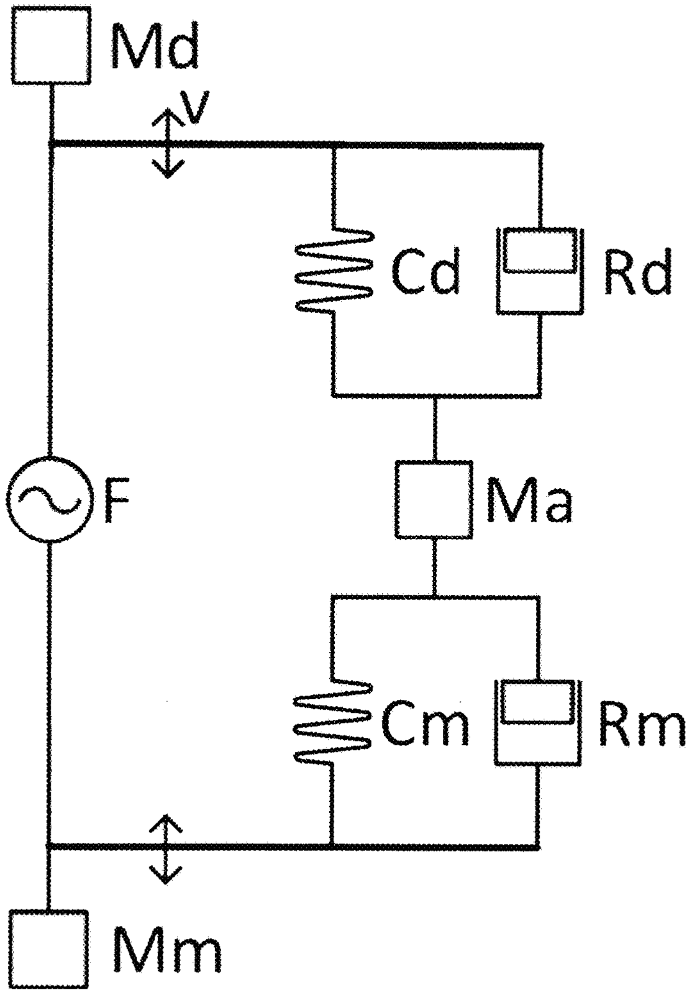

FIGS. 5A and 5B illustrate a ‘Type 1’ loudspeaker 101*a* according to the present disclosure.

In this Type 1 loudspeaker 101*a*, the diaphragm 102*a* is a cantilever diaphragm and therefore air volume displacement is 0.4 that of an equivalent free diaphragm. Here, a voice coil 108*a* attached to the diaphragm 102*a* (and therefore part of the mass of the diaphragm) extends into a magnetic gap (not shown) in the magnet system. Compliance Cd and mass Md are distributed over the diaphragm 102*a*. The magnet unit Mm suspended from ground or mass of application Ma (frame) via two roll suspensions 104*a* defines a total compliance Cm in order to filter the vibrations reaching the application from which the magnet unit Mm is suspended above the tuning frequency of Cm and Mm.

Figure 6A:
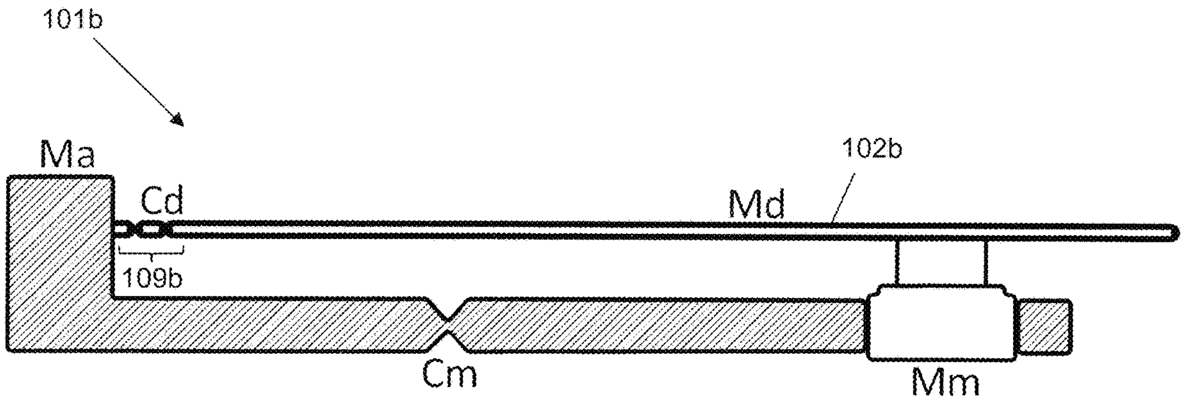
FIGS. 6A and 6B illustrate a 'Type 2' loudspeaker according to the present disclosure.
Figure 6B:
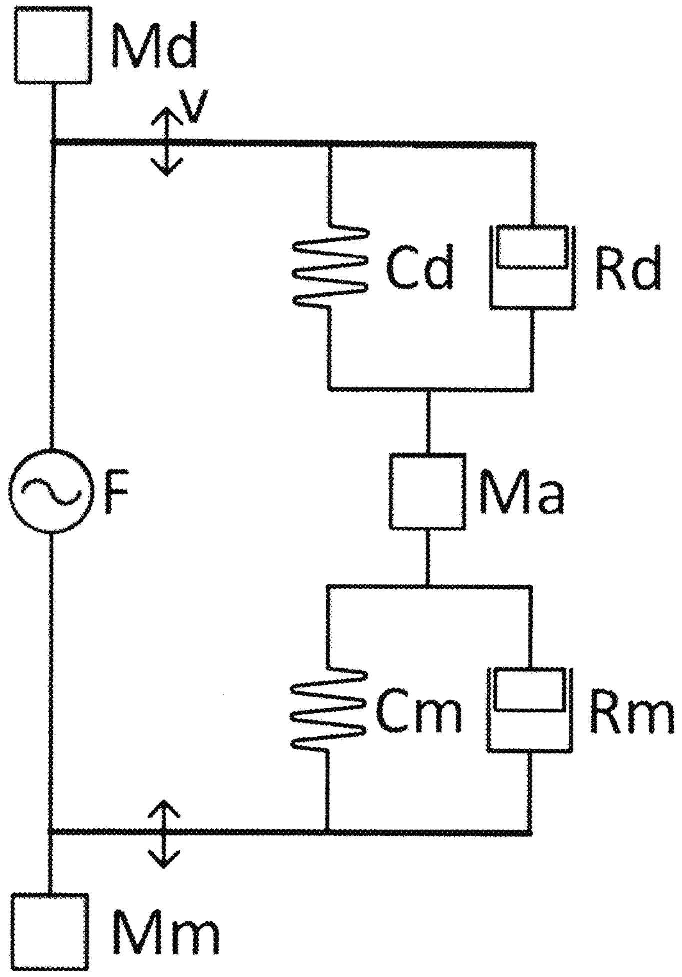

FIGS. 6A and 6B illustrate a ‘Type 2’ loudspeaker 101*b* according to the present disclosure.

In this Type 2 loudspeaker 101*b*, the diaphragm 102*b* is a hinged diaphragm and therefore air volume displacement is 0.5 that of an equivalent free diaphragm. Compliance Cd is provided by a tuned weakened region 109*b* in the diaphragm 102*b* that functions as the hinge. This hinge urges the diaphragm 102*b* back to the rest position. Mass Md is defined by the hinged diaphragm 102*b*. Note that here the stiffness of the diaphragm 102*b* is independent from the compliance Cd of the hinge, and this advantageously allows the fundamental frequency (the frequency of the first harmonic mode of the diaphragm 102*b*) to be tuned independently of the material of the diaphragm 102*b*. Magnetic circuit Mm is suspended from ground or mass of application Ma via a tuned corrugation Cm in the frame that holds the magnetic circuit Mm.

Figure 7A:
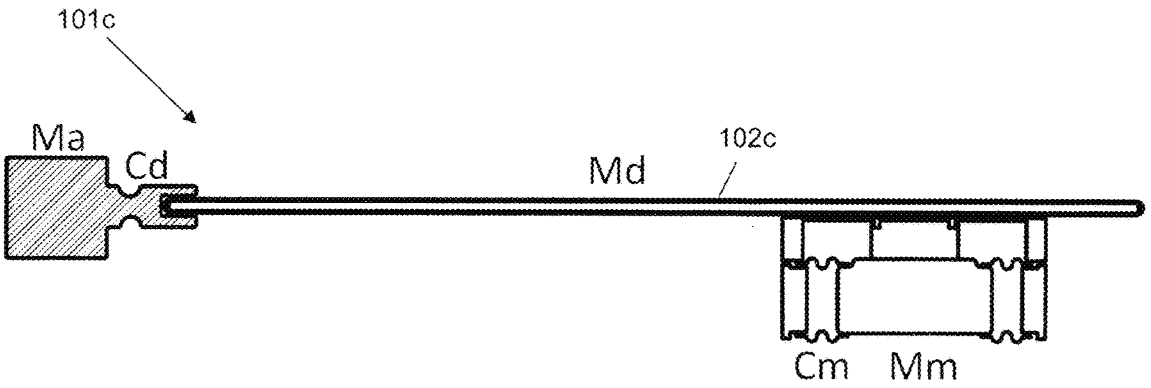
FIGS. 7A and 7B illustrate a 'Type 3' loudspeaker according to the present disclosure.
Figure 7B:
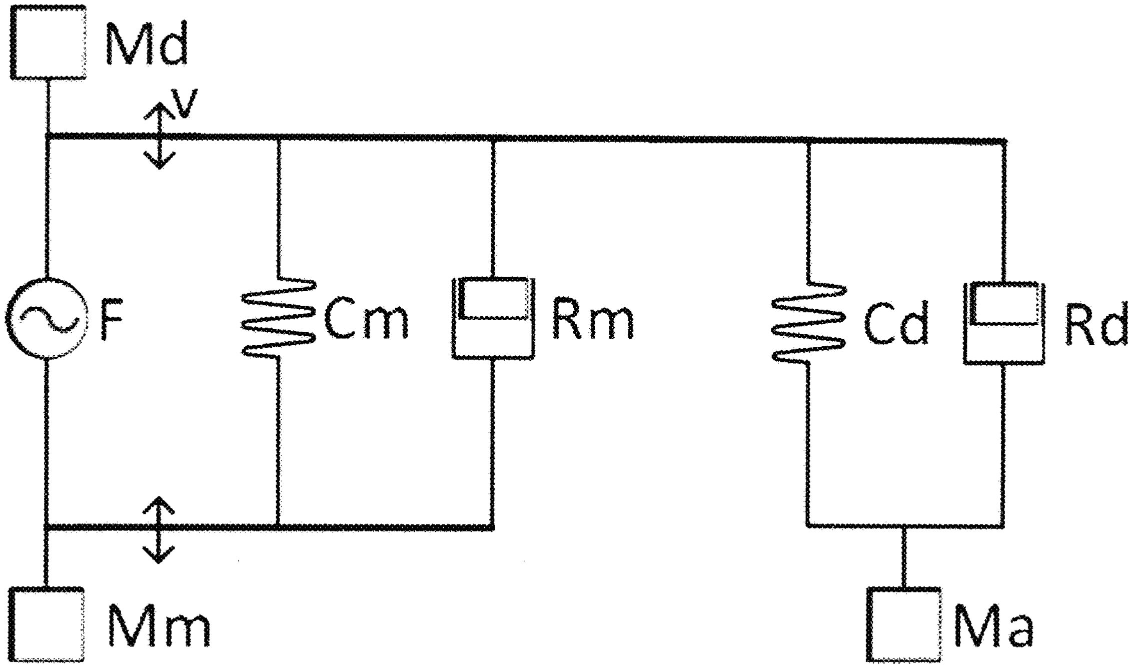

FIGS. 7A and 7B illustrate a ‘Type 3’ loudspeaker 101*c* according to the present disclosure.

In this Type 3 loudspeaker 101*c*, the diaphragm 102*c* is a hinged diaphragm and therefore air volume displacement is 0.5 that of an equivalent free diaphragm. Here, the hinge Cd is integrated in the frame Ma, whereby the portion of frame material beyond the hinge Cd should be viewed as part of the diaphragm 102*c*, according to this disclosure (since it acts as diaphragm, rather than frame). In this example, the magnetic circuit Mm is suspended on the diaphragm 102*c* via a compliance Cm.

Figure 8A:
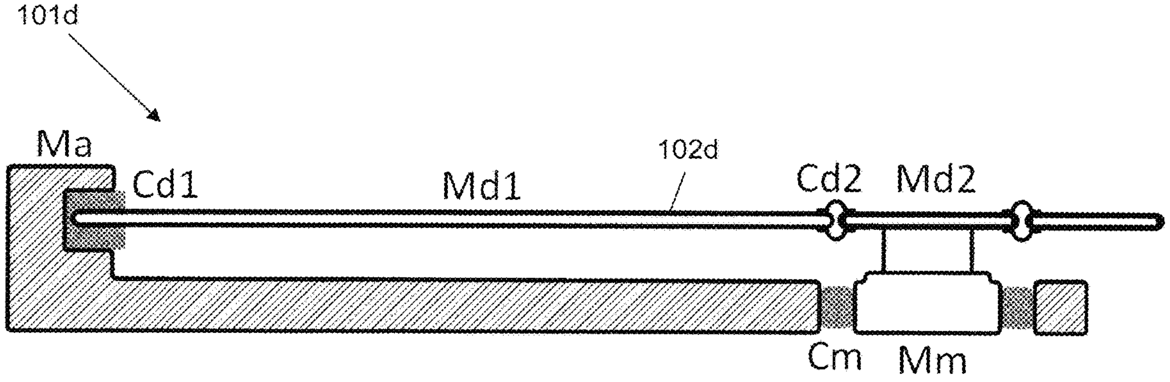
FIGS. 8A and 8B illustrate a 'Type 4' loudspeaker according to the present disclosure.
Figure 8B:
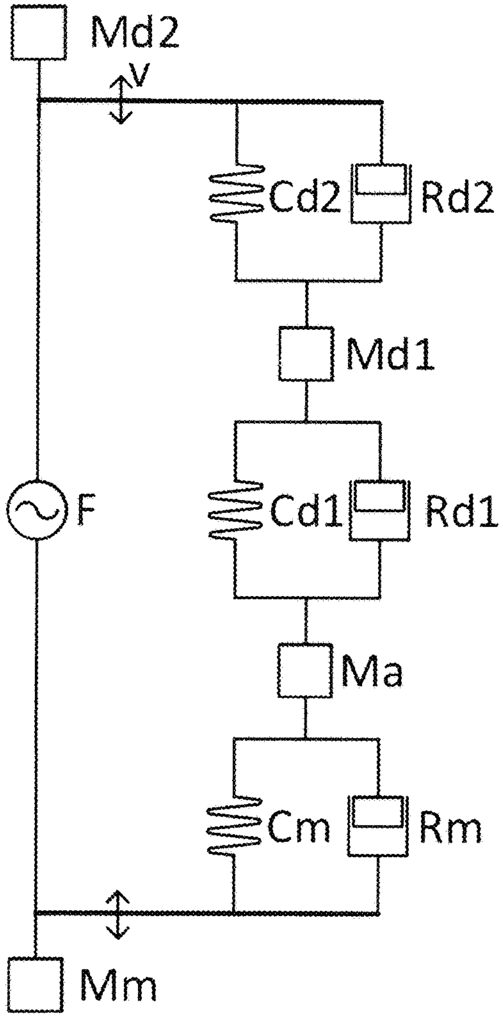

FIGS. 8A and 8B illustrate a ‘Type 4’ loudspeaker 101*d* according to the present disclosure.

In this Type 4 loudspeaker 101*d*, the diaphragm 102*d* is a hinged diaphragm and therefore air volume displacement is 0.5 that of an equivalent free diaphragm. In this example, a first compliance Cd1 is executed as a hinge by means of a foam or rubber in which the diaphragm 102*d* is clamped to the frame (Ma). A secondary smaller diaphragm Md2 is suspended within a primary larger diaphragm Md1. The primary diaphragm provides the secondary compliance Cd2 which suspends the secondary diaphragm from the primary diaphragm. Md2 can move at higher frequencies compared with Md1, thereby extending the frequency range of operation of the loudspeaker. Also the magnetic circuit Mm can be elastically suspended by means of foam or rubber suspension Cm to the frame Ma.

Other loudspeaker 'Types' could be envisaged by a skilled person within the scope of the present invention, e.g. based on combinations of features from the Type 1-4 loudspeakers described above.

Figure 9A:
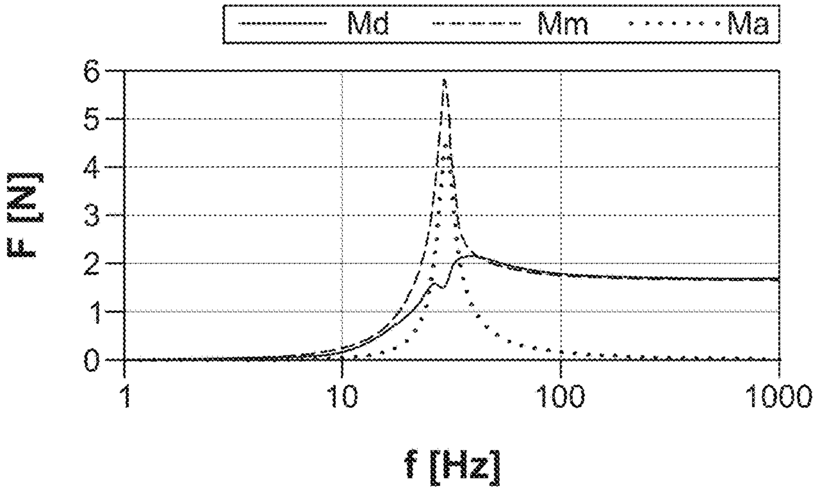
FIGS. 9A-9C shows simulation results for the "Type 1", "Type 2", "Type 3" and "Type 4" loudspeakers.

FIG. 9A shows, for both the Type 1 and Type 2 loudspeakers, calculation results of the force acting on Md, Mm and Ma respectively upon input power of 1 W, when the loudspeakers are given the following parameters:

- Re=3.4 ohm [Re is electrical voice coil resistance at DC (0 Hz)]
- BL=2 Tm [BL is motor force factor (force resulting from the voice coil wire length (L) and magnetic field (B)]
- Rm=1 Ns/m [Rm is mechanical resistance of losses in suspension of magnet system]
- Rd=1 Ns/m [Rd is mechanical resistance of losses in suspension of diaphragm]
- Cm=0.5 mm/N [Cm is compliance of magnet unit suspension]
- Cd=2 mm/N [Cd is compliance of the diaphragm]
- Mm=70 g [Mm is mass of the magnetic circuit]
- Md=15 g [Md is mass of the diaphragm]
- Ma=0.5 kg [Ma is mass of the application]

From FIG. 9A, a strong reduced level of force on the application Ma (which may e.g. be a frame from which the loudspeaker is suspended) can be seen. The forces peak at −30 Hz, indicating this is the tuning frequency of the magnetic circuit suspension. The loudspeaker should not be used at f1, so this loudspeaker may be configured for use at frequencies of 40 Hz or over, for example.

However, one could for example tune f1 below the audible bandwidth, let say below 20 Hz or even 10 Hz to extend the useful audio bandwidth and further reduce the force on the application. One could use the force peak of this tuning frequency to generate strong mechanical vibrations in the headrest or seat for alerting purposes; e.g. if one would supply the exampled system with an electrical signal of 30 Hz, strong vibrations could be transmitted to a user via their seat.

Figure 9B:
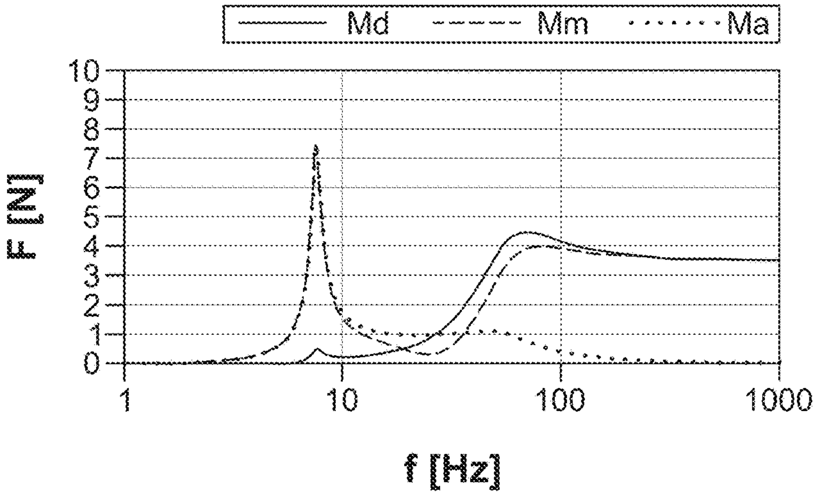

FIG. 9B shows, for the Type 3 loudspeaker, calculation the force acting on Md, Mm and Ma respectively upon input power of 1 W, when the loudspeakers are given the following parameters:

- Re=3.4 ohm
- BL=3 Tm
- Rm=2 Ns/m
- Rd=1 Ns/m
- Cm=0.6 mm/N
- Cd=2 mm/N
- Mm=200 g
- Md=20 g
- Ma=1 kg From FIG. 9B, a slightly worse attenuation of force on the application Ma can be seen (see dotted line labelled Ma), compared with FIG. 9A.

Figure 9C:
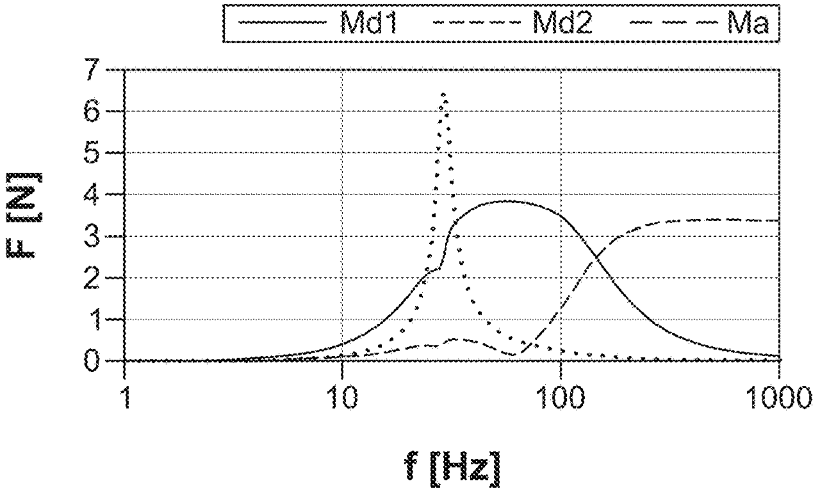

FIG. 9C shows, for the Type 4 loudspeaker, calculation the force acting on Md, Mm and Ma respectively upon input power of 1 W, when the loudspeakers are given the following parameters:

- Re=3.4 ohm
- BL=4 Tm
- Rm=1 Ns/m
- Rd1=1 Ns/m [Rd1 is mechanical resistance of losses in suspension of larger diaphragm]
- Rd2=1 Ns/m [Rd2 is mechanical resistance of losses in suspension of smaller diaphragm]
- Cm=0.2 mm/N
- Cd1=1 mm/N [Cd1 is compliance of suspension of larger diaphragm]
- Cd2=0.3 mm/N [Cd2 is compliance of suspension of smaller diaphragm]
- Mm=250 g
- Md1=30 g [Md1 is mass of the larger, outer diaphragm]
- Md2=5 g [Md2 is mass of the smaller, inner diaphragm]
- Ma=0.5 kg From FIG. 9C, a cross-over at −250 Hz between the larger diaphragm (Md1) providing the most force and the smaller diaphragm (Md2) providing the most force can be seen. Thus, at lower frequencies, the larger diaphragm is dominant, whereas at higher frequencies the smaller diaphragm is dominant.

The Type 1-4 designs can be summarised as follows:

- Type 1: Cantilever with magnet circuit elastically suspended from ground
- Type 2: Hinge with magnet circuit elastically suspended from ground
- Type 3: Cantilever or Hinge with magnet circuit elastically suspended from diaphragm
- Type 4: Two-way system Possible Diaphragm Constructions A variety of materials may be used for the diaphragm, depending on the application. For example, the diaphragm may be made of:

- Composites, e.g. laminated materials "sheet/filler/sheet" in which the sheets are typically stiff materials (paper, aluminum, mylar, carbon fiber, etc.) and the filler material's function is to keep top and bottom sheet at a fixed distance defining the resulting stiffness of the composite. Typical materials for the filler material are foams, and corrugated materials such as honeycomb formations that have low density.
- Plain closed cell foams or one side laminated foams, especially suited in headrest applications due to their protective soft nature.
- Injection molded structures specifically designed for low mass that have a grid or perforated structure covered with paper, textile or foam. It is possible to cover such a structure with a layer of open cell foam that has typically very good sound absorption properties for mid and high frequencies. In this way the large radiating area of the subwoofer diaphragm is able to act in the same time to limit the leakage of mid and high frequencies outside the headrest. Mid and high frequencies will be typically generated by a separate smaller transducer such as a tweeter or small full range loudspeaker. The head of a user will reflect the acoustic energy of mid and high frequencies hence the more absorption around the head the less leakage outside the cocoon for mid and high frequencies (E.g. 1 kHz and above).
- Note that open cell foams are available in a wide variety of densities and cell structures which define the foam's properties regarding flow resistivity and sound absorption
- Insert moulded structures, e.g. a plastic part (e.g. plastic sheet or structure) that is inserted in the mould of a foam before the making/injection of the foam. In this way a homogeneous assembly of a stiffer inner plastic part covered with foam can be achieved. In some examples, the foam could be an open cell PU foam. The process of injection moulding PU foam would result in an open cell foam part provided with a closed cell skin due to the forming of the foam in a mould. The skin however would reflect more sound at mid and high frequencies as compared to an open cell surface structure. A good reason to do this is that the foam surrounding the plastic insert could provide additional damping to the diaphragm, improving its performance when using it for an extended frequency range (e.g. up to 1 kHz, or even full range up to 20 kHz). Note that, typically, open cell foams are much too soft to be used on their own as a diaphragm in a cantilever design. Compared to closed cell foams such as EPP or EPS their Youngs modulus is typically 1000× less; typically, around 10 kPa.

The construction and materials used for the diaphragm can be used to configure the diaphragm to have a fundamental mode with a predetermined frequency (f1). Some examples might be as follows:

Example EPP Foam:
E=15 MPa [Youngs modulus]
ρ=100 kg/m$^3$ [Density]
t=0.01 m [Thickness]
l=0.14 m [Length]
f1=32 Hz [Fundamental or first harmonic frequency]

Example EPS Foam
E=7 MPa [Youngs modulus]
ρ=25 kg/m$^3$ [Density]
t=0.005 m [Thickness]
l=0.14 m [Length]
f1=22 Hz [Fundamental or first harmonic frequency]

Example ABS Plastic
E=2 GPa [Youngs modulus]
ρ=1100 kg/m$^3$ [Density]
t=0.002 m [Thickness]
l=0.14 m [Length]
f1=22 Hz [Fundamental or first harmonic frequency]

We now describe some example diaphragm constructions that could be incorporated into a loudspeaker according to the invention.

Figure 10A:
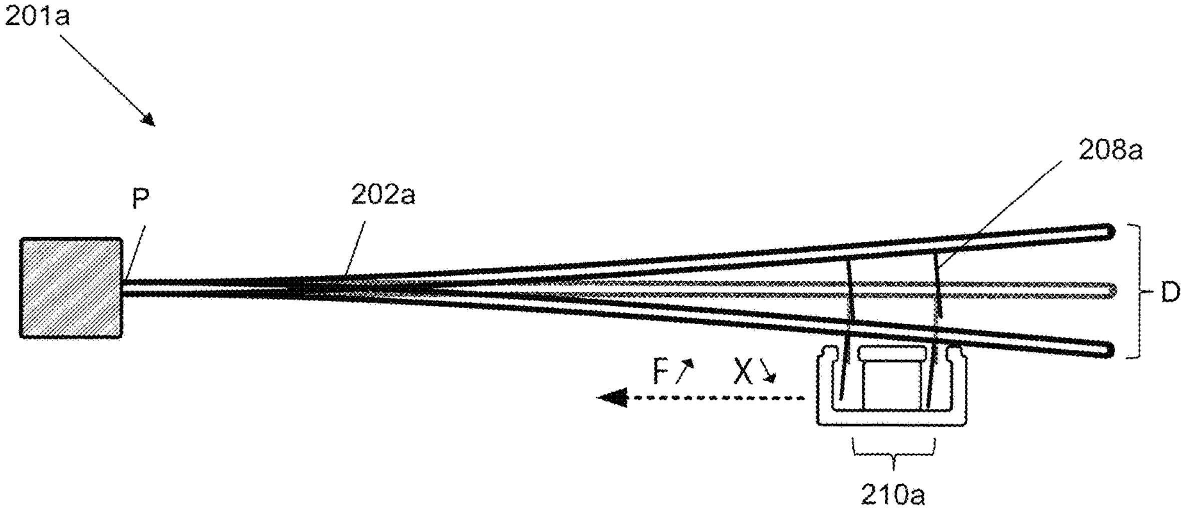
FIGS. 10A and 10B show an example loudspeaker illustrating A) an enlarged airgap, and B) a magnet unit shaped along the path of the voice coil.

FIG. 10A shows an example loudspeaker illustrating an enlarged airgap.

The loudspeaker 201*a* of FIG. 10A includes a cantilever diaphragm 202*a* integral with a voice coil former, with a voice coil 208*a* mounted on the voice coil former, and a corresponding magnet unit 210*a*.

Here, the magnet unit 210*a* has an enlarged airgap (e.g. 3 mm mm or more, in a direction parallel to a radiating surface of the diaphragm 202*a* at rest) to allow rotational movement of voice coil 208*a*, which is also beneficial to make the operation of the location of the node 10*a* in the second harmonic mode of the diaphragm 202*a*, but if the diaphragm 202*a* is not driven at this position, then the second harmonic mode of the diaphragm 202*a* will not be suppressed and therefore the range of frequencies over which the diaphragm 202*a* can be used will be reduced. In a normal loudspeaker the airgap is dimensioned so that on the outer and inner side of the voice coil a gap of approximately 0.5 mm is created. So, if the winding width of the voice coil is 1 mm the airgap would be 2 mm wide. For the same voice coil in a cantilever design the airgap would preferably be 3 mm or more.

In FIG. 10A, the letter X indicates the excursion of the diaphragm at a reference point (e.g. the outer end of the diaphragm) and F indicates the force required by the drive unit (via the voice coil-magnet unit interaction) to achieve an excursion X.

One can reduce the required excursion of the voice coil 208*a* by shifting the drive point inwards, i.e. towards the proximal end P of the diaphragm 202*a*. The same excursion of the diaphragm 202*a* can be achieved, hence more force factor (BL) required. Here, force factor (or "BL") BL is the product of the magnetic field B and the wire length of the voice coil into the magnetic field defining the resulting force upon a current I through the wire, where the force (F) is given by B*L*I.

Figure 10B:
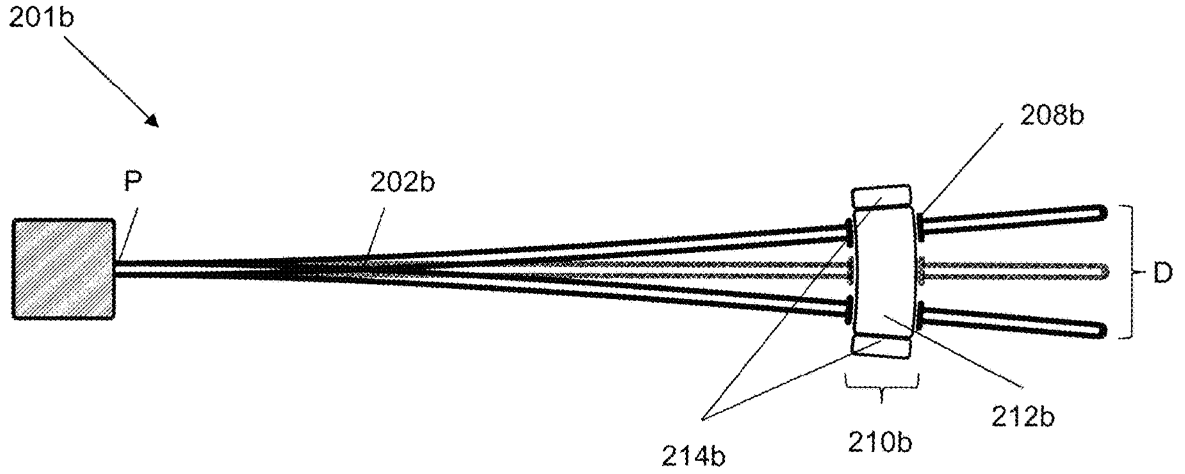

FIG. 10B shows an example loudspeaker 201*b* illustrating a magnet unit 210*b* shaped along the path of the voice coil 208*b*.

In this example, the diaphragm 202*b* has a hole in which the voice coil 208*b* is mounted (with an axis of the voice coil 208*b* perpendicular to a radiating surface of the diaphragm 202*b* at the hole).

Also shown in this example, is an open magnet circuit 210*b*, arranged with an inner core 212*b* (e.g. made of steel) that is curved along the path of the voice coil, and two outer magnets 214*b*. Each outer magnet 214*b* is arranged to have the same pole facing the other outer magnet 214*b* (i.e. North-North or South-South). This pushes magnetic flux out of the inner core 212*b* thereby providing a magnetic field that allows the drive unit to operate when current is supplied to the voice coil 208*b*.

Figure 11A:
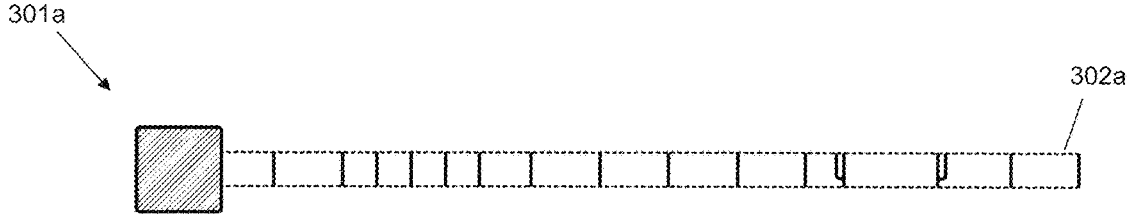
FIGS. 11A-C show a first example diaphragm construction.
Figure 11B:
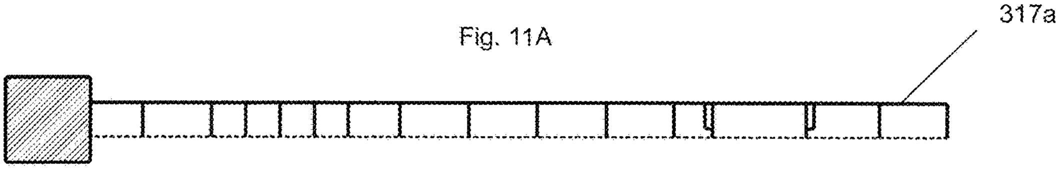
Figure 11C:
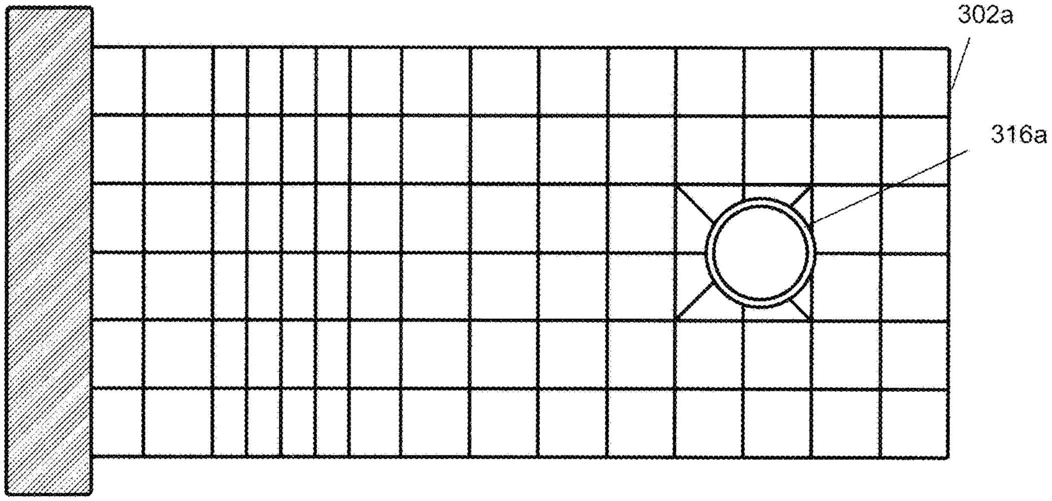

FIGS. 11A-C show an example diaphragm construction 301*a*.

Here, FIGS. 11A and 11C show a plastic grid structure (e.g. made of polycarbonate, ABS, polypropylene) designed to have a required amount of stiffness, whilst reducing weight. A mount 316*a* for mounting a voice coil former to the diaphragm 302*a* is shown in FIG. 11C.

FIG. 11B shows one side of the plastic grid structure covered by a covering material 317*a* (e.g. made of paper, open or closed cell foam, textile) to permit volume displacement. Preferably both sides of the plastic grid structure would be covered by the covering material 317*a*, preferably leaving a hole to permit mounting of a voice coil former via the mount 316*a*, to provide the diaphragm 302*a*.

Figure 11D:
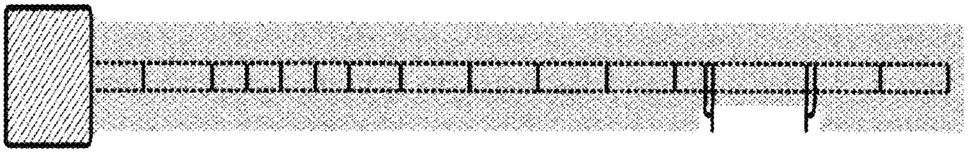
FIG. 11D shows an alternative first example diaphragm construction.

FIG. 11D shows an alternative implementation of the diaphragm construction shown in FIGS. 11A-C, in which the plastic grid structure is insert moulded (inserted in the mould of a foam before the making/injection of the foam) in an open cell foam, e.g. PU foam.

Figure 12A:
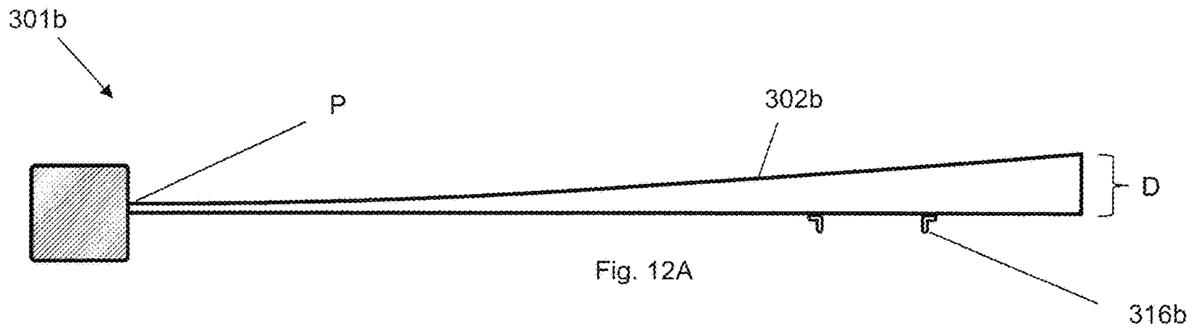
FIGS. 12A-C show a second example diaphragm construction.
Figure 12B:
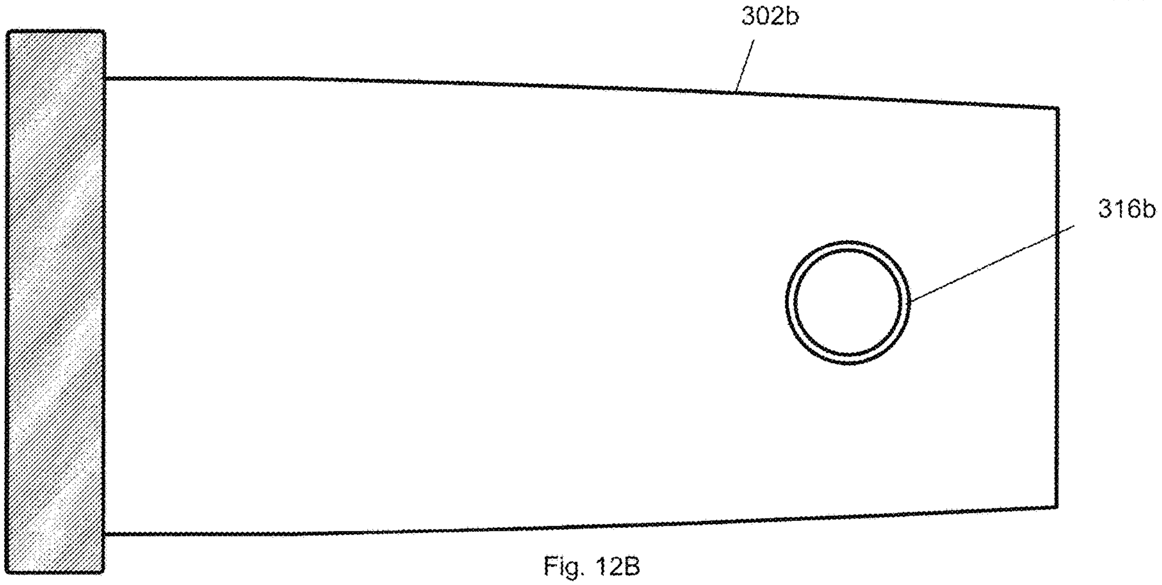
Figure 12C:
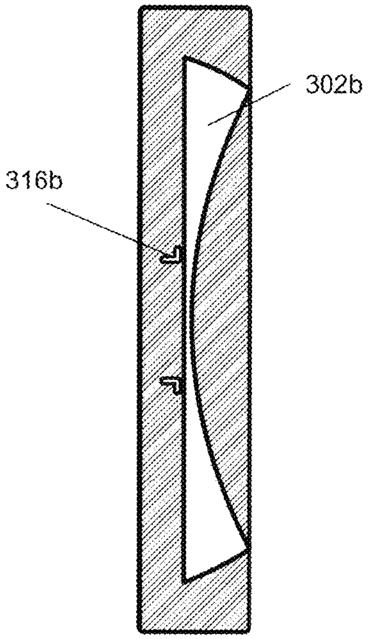

FIGS. 12A-C show another example diaphragm construction 301*b*.

Here, the diaphragm 302*b* is curved in the length direction (from proximal end P to distal end D) as well as in the width direction (transverse to the length direction) to increase stiffness whilst minimizing material.

A mount 316*b* for a voice coil former is shown as being attached to a bottom of the diaphragm 302*b*.

The curved material could be plastic. The plastic could be embedded in foam, as shown in FIG. 12C.

Figures 13A, 13B:
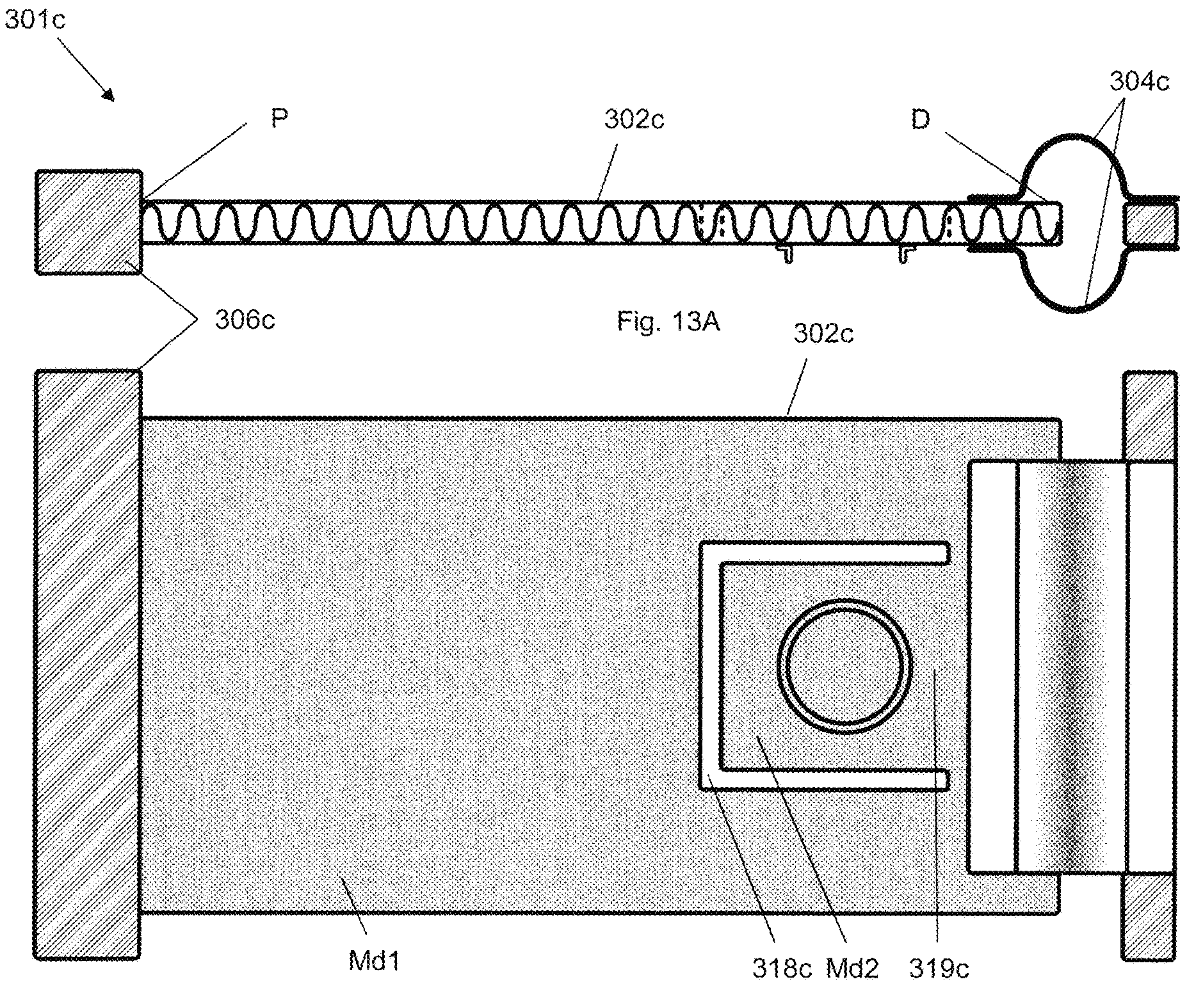
FIGS. 13A-B show a third example diaphragm construction.

FIGS. 13A-B show another example diaphragm construction 301*c*.

Here, the diaphragm 302*c* is a laminate material, with a corrugated core located between two skins.

A proximal end P of the diaphragm 302*c* is suspended from the frame 306*c* by a suspension element (not shown) configured to substantially prevent translational movement of the proximal end P of the diaphragm 302*c* relative to the frame 306*c*, whilst permitting translational movement of a distal end D of the diaphragm 302*c* which is opposite to the proximal end P of the diaphragm 302*c*.

The distal end D of the diaphragm 302*c* is suspended from the frame 306*c* by two additional suspension elements (roll suspensions 304*c*) which are configured to permit translational movement of a distal end D of the diaphragm 302*c*. The additional suspension elements 304*c* are configured to reduce potential rocking modes and to add extra stiffness to the motion of the diaphragm 302*c*.

A cut out 318*c* in the main diaphragm 302*c* means that a second smaller diaphragm Md2 is suspended within a larger diaphragm (Md1), according to the Type 4 loudspeaker 101*d* referenced above. Note that here, the uncut region 319*c* acts as a suspension for the smaller diaphragm Md2.

Example Headrest Implementations

FIGS. 14A(i)-14E(ii) illustrate several examples of a headrest 400*a-e* for incorporating two loudspeakers 401-1*a-e*, 401-2*a-e* according to the present disclosure. Where possible, alike features have been given corresponding reference numerals, so that such features may not need to be described in further detail.

In each of the examples, the headrest 400*a-e* is part of a seat assembly for a car, the seat assembly comprising a seat, a headrest 400*a-e* and two loudspeakers 401-1*a-e*, 401-2*a-e*.

The headrest 400*a-e* of the seat comprises: a rear portion 430*a-e* located behind a head of a user sat in the seat; a first wing portion 432-1*a-e* extending from a first side of the rear portion 430*a-e* to a position at least partially along a first side of a head of a user sat in the seat; and a second wing portion 432-2*a-e* extending from a second side of the rear portion 430*a-e* to a position at least partially along a second side of the head of a user sat in the seat.

The headrest 400*a-e* is attached to the seat by a headrest support 433*a-e* which extends upwards from the seat and through the rear portion 430*a-e* of the headrest 400*a-e*.

The loudspeakers 401-1*a-e*, 401-2*a-e* are mounted within the headrest 400*a-e* of the seat, such that a first loudspeaker 401-1*a-e* is located within the first wing portion 432-1*a-e* and the second loudspeaker 401-2*a-e* is located within the second wing portion 432-2*a-e*.

In each case, each loudspeaker 401-1*a-e*, 401-2*a-e* comprises one or more diaphragms 402-1*a-e*, 402-2*a-e* suspended from a frame 406*a-e*. At least part of the frame 406*a-e* is located within the rear portion 430*a-e* of the headrest 400*a-e* and is configured to interact with the headrest support 433*a-e*. A first frame part 406-1*a-e* extends from a first side of the rear portion 430*a-e* and at least partially into the first wing portion 432-1*a-e*. A second frame part 406-2*a-e* extends from a second side of the rear portion 430*a-e* and at least partially into the second wing portion 432-2*a-e*.

Each diaphragm 402-1*a-e*, 402-2*a-e* comprises a first radiating surface 421-1*a-e*, 421-2*a-e* and a second radiating surface 422-1*a-e*, 422-2*a-e* located on the opposite face of the diaphragm 402-1*a-e*, 402-2*a-e*. The first radiating surface 421-1*a-e*, 421-2*a-e* faces towards the head of a user sat in the seat, whereas the second radiating surface 422-1*a-e*, 422-2*a-e* faces away from the head of a user sat in the seat.

The/each diaphragm 402-1*a-e* of the first loudspeaker 401-1*a-e* extends from the first frame part 406-1*a-e* and at least partially along the first wing portion 432-1*a-e* such that its first radiating surface 421-1*a-e* is positioned at least partially along a first side of the head of a user sat in the seat. Similarly, the/each diaphragm 402-2*a-e* of the second loudspeaker 401-2*a-e* extends from the second frame part 406-2*a-e* and at least partially along the second wing portion 432-2*a-e* such that its first radiating surface 421-2*a-e* is positioned at least partially along a second side of the head of a user sat in the seat.

Each loudspeaker 401-1*a-e*, 401-2*a-e* has a drive unit configured to move the/each diaphragm 402-1*a-e* within each respective loudspeaker 401-1*a-e*, 401-2*a-e*, 402-2*a-e* based on an electrical signal derived from an audio source.

The drive unit of each loudspeaker 401-1*a-e*, 401-2*a-e* is an electromagnetic drive unit that includes a magnet unit 410-1*a-e*, 410-2*a-e* configured to produce a magnetic field, and a voice coil 408-1*a-e*, 408-2*a-e* configured to interact with the magnetic field produced by the magnetic unit 410-1*a-e*, 410-2*a-e*.

In use, each voice coil 408-1*a-e*, 408-2*a-e* may be energized (have a current passed through it) to produce a magnetic field which interacts with the magnetic field produced by the respective magnet unit 410-1*a-e*, 410-2*a-e* and which causes the voice coil 408-1*a-e*, 408-2*a-e* (and therefore each diaphragm 402-1*a-e*, 402-2*a-e*) to move relative to the respective magnet unit 410-1*a-e*, 410-2*a-e*. Each magnet unit 410-1*a-e*, 410-2*a-e* may include a permanent magnet. Each magnet unit 410-1*a-e*, 410-2*a-e* may be configured to provide an air gap, and may be configured to provide a magnetic field in the air gap. Each voice coil 408-1*a-e*, 408-2*a-e* may be configured to sit in the respective air gap when the respective diaphragms 402-1*a-e*, 402-2*a-e* are at rest.

When a current is passed through each voice coil 408-1*a-e*, 408-2*a-e*, it will produces a magnetic field which interacts with the magnetic field produced by each respective magnet unit 410-1*a-e*, 410-2*a-e* which will cause the respective diaphragm 402-1*a-e*, 402-2*a-e* to move relative the respective magnet unit 410-1*a-e*, 410-2*a-e*. Such drive units are well known.

When the loudspeakers 401-1*a-e*, 401-2*a-e* are in use, the seat may be configured to position a user who is sat down in the seat such that a first ear of a user is located at a first listening position that is in front and 50 cm or less (more preferably 40 cm or less, more preferably 30 cm or less, more preferably 25 cm or less, more preferably 20 cm or less, more preferably 15 cm or less) from the first radiating surface 421-1*a-e* of the diaphragm 402-1*a-e* of the first loudspeaker, and a second ear of the user is located at a listening position that is in front of and 50 cm or less (more preferably 40 cm or less, more preferably 30 cm or less, more preferably 25 cm or less, more preferably 20 cm or less, more preferably 15 cm or less) from the first radiating surface 421-2*a-e* of the diaphragm 402-2*a-e* of the second loudspeakers.

Figure 14B:
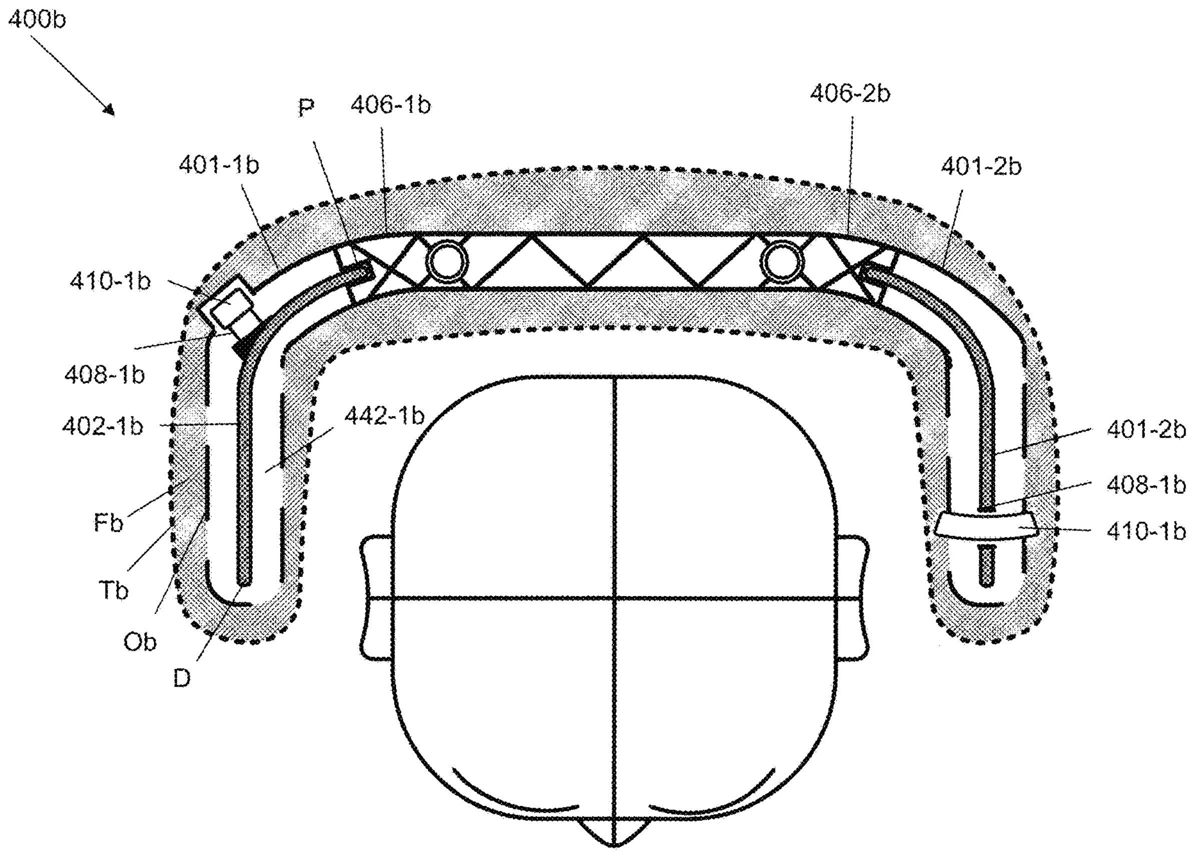
FIG. 14B(i) shows a second example headrest incorporating a loudspeaker according to the present disclosure.

Further features of the examples of a headrest 400*a-e* for a car incorporating two loudspeakers 401-1*a-e*, 401-2*a-e* according to the present disclosure, will be described herein with reference to FIGS. 14A(i)-14E(ii). FIGS. 14A-E(*i*) are top down views of the headrest 400*a-e* and FIGS. 14A, C-E(ii) are side views of the headrest 400*a-e*, when in use by a user sat in the seat.

FIGS. 14A(i) and 14A(ii) show a first example headrest 400*a* incorporating two loudspeakers 401-1*a*, 401-2*a* according to the present disclosure.

As shown by FIG. 14A(i), the diaphragm 402-1*a* of the first loudspeaker 401-1*a* is rigidly attached by its proximal end P to the first frame part 406-1*a* by a rigid clamp. As such, translational movement of the proximal end P-1 of the diaphragm 402-1*a* relative to the frame 406*a* is substantially prevented, whereas translational movement of the distal end D of the diaphragm 402-1*a*, which is opposite to the proximal end P of the diaphragm 402-1*a*, is permitted.

This diaphragm 402-1*a* is a cantilever diaphragm as discussed above with reference to FIG. 1B. The diaphragm 402-2*a* of the second loudspeaker 401-2*a* is flexibly attached by its proximal end P to the second frame part 406-2*a* by a flexible clamp. The flexible clamp may be formed from an elastic material such as rubber. Due to the flexible attachment of the diaphragm 402-2*a* to the second frame part 406-2*a*, translational movement of the proximal end P of the diaphragm 402-2*a* relative to the frame 406*a* is permitted. Translational movement of the distal end D of the diaphragm 402-2*a* is also permitted.

This diaphragm 402-2*a* is a hinged diaphragm as discussed above with reference to FIG. 1C.

The first frame part 406-1*a* extends from the frame 406*a* in the rear portion 430*a* of the headrest 400*a*, and curves in the length direction around a first side of the head of a user, such that the first radiating surface 421-1*a* of the diaphragm 402-1*a* of the first loudspeaker 401-1*a* is approximately parallel to the first side of the head of a user sat in the seat.

Similarly, the first radiating surface 421-2*a* of the diaphragm 402-2*a* of the second loudspeaker 401-2*a* is approximately parallel to the second side of the head of a user sat in the seat.

Each diaphragm 402-1*a*, 402-2*a* is approximately linear such that the first radiating surfaces 421-1*a-e*, 421-2*a-e* of the diaphragms 402-1*a*, 402-2*a* are approximately flat. As such, the first radiating surface 421-1*a* of the diaphragm 402-1*a* of the first loudspeaker 401-1*a* is opposite to and is approximately parallel to the first radiating surface 421-2*a* of the diaphragm 402-2*a* of the second loudspeaker 401-2*a*.

The first radiating surfaces 421-1*a* of the diaphragms 402-1*a*, 402-2*a* of the first loudspeaker 401-1*a* and the second loudspeaker 401-2*a* are approximately perpendicular to the frame 406*a* in the rear portion 430*a* of the headrest 400*a*.

The electromagnetic drive unit of each loudspeaker 401-1*a*, 401-2*a* includes a magnet unit 410-1*a*, 410-2*a* and a voice coil 408-1*a*, 408-2*a*. Each voice coil 408-1*a*, 408-2*a* is rigidly attached to a respective one of the diaphragms 402-1*a*, 402-2*a*. Each magnet unit 410-1*a*, 410-2*a* is elastically suspended from the frame 406, preferably such that the resonant frequency of the magnetic unit 410-1*a*, 410-2*a* and its suspension is below the lowest operating frequency of the loudspeakers 401-1*a*, 401-2*a*.

In each loudspeaker 401-1*a*, 401-2*a*, the magnet unit 410-1*a*, 410-2*a* and the voice coil 408-1*a*, 408-2*a* are located on the diaphragm 402-1*a*, 402-2*a* at a position along the diaphragm 402-1*a*, 402-2*a* which corresponds to a node in the second fundamental frequency of the diaphragm 402-1*a*, 402-2*a* as discussed above with reference to FIG. 3.

Each voice coil 408-1*a*, 408-2*a* may be attached to the respective diaphragm 402-1*a*, 402-2*a* via a voice coil coupler 428-1*a*, 428-2*a* (shown with reference to the second voice coil 408-2*a*). The voice coil coupler 428-1*a*, 428-2*a* is an extended voice coil coupler 428-1*a*, 428-2*a* which reinforces the diaphragm by providing additional mechanical strength.

The voice coil coupler 428-1*a*, 428-2*a* could be made of plastic, e.g. ABS, PC, or PVC, and may be filled with (e.g. 20%) glass fibres to improve structural strength. The voice coil coupler 428-1*a*, 428-2*a* could also be perforated to facilitate gluing and/or to allow visual inspection of the amount and curing of glue used. The size of the voice coil coupler 428-1*a*, 428-2*a* could be extended as needed for crash impact protection. The loudspeakers 401-1*a*, 401-2*a* illustrated in this example are Type 1 and 2 loudspeakers respectively, as discussed above with reference to FIGS. 5A and 5B and 6A and 6B. Here it is noted that both magnetic circuits are flexible suspended in a cavity provided in the frame 406 (note that the frame extends around the diaphragms in order to allow the diaphragm's excursion while providing a structure for a foam or another open structure to cover it to allow a comfortable finishing of the headrest). Also, the extended frame is perforated or has sufficient openings to allow the passage of the volume displacement that the diaphragms create.

In this example, the diaphragms 402-1*a*, 402-2*a* are surrounded by a layer of material which extends from the frame 406*a* and has a perforated structure (labelled Oa). A cavity 442-1*a*, 442-1*a* is formed between each diaphragm 402-1*a*, 402-2*a* and the Oa layer to provide each diaphragm 402-1*a*, 402-2*a* with sufficient space to vibrate. A layer of a material having such as foam (labelled Fa) surrounds the Oa layer, and forms the shape of the headrest 400*a*. This foam may have an open cell structure in front of the diaphragms (to allow volume displacement) whilst a denser foam (less open) may be used elsewhere for reasons of headrest comfort. The entire headrest 400*a* structure is covered by a porous textile finishing layer (labelled Ta).

FIG. 14B(i) shows a second example headrest 400*b* incorporating two loudspeakers 401-1*b*, 401-2*b* according to the present disclosure.

In this example, the diaphragm 402-1*b* of the first loudspeaker 401-1*b* and the diaphragm 402-2*b* of the second loudspeaker 401-2*b* are both rigidly attached by their proximal ends P to opposing ends of the frame 406-1*b*, 406-2*b*, such that translational movement of the proximal ends P of the diaphragms 402-1*b*, 402-2*b* relative to the frame 406*b* is substantially prevented, whereas translational movement of the distal ends D of the diaphragms 402-1*b*, 402-2*b* is permitted.

Therefore, in this example, the diaphragms 402-1*b*, 402-2*b* are both examples of a cantilever diaphragm as discussed above. The curvature in the diaphragm here is mainly to extend the effective length of the diaphragm within a given headrest design so that a larger surface of the cantilever (distal part closest to the ears) makes the most excursion. It is in fact maximizing the available space optimally. Ultimately in another implementation (not shown) the two cantilever diaphragms could meet each other with their proximal ends in the middle behind the head of a user.

In this example, a proximal region of each diaphragm 402-1*b*, 402-2*b* is curved in the length direction (from proximal end P to distal end D) around the head of the user, such that a proximal region of the first diaphragm 402-1*b* curves around the first side of the head of a user and a proximal region of the second diaphragm 402-2*b* curves around the second side of the head of a user.

Here, a distal region of each diaphragm 402-1*b*, 402-2*b* is approximately flat to provide approximately flat radiating surfaces 421-1*b*, 421-2*b*, 422-1*b*, 422-2*b*. But depending on the design of the headrest, the curvature could be continuous over the total length of the cantilever. The first radiating surface 421-1*b* of the diaphragm 402-1*b* of the first loudspeaker 401-1*b* is opposite to and is approximately parallel to the first radiating surface 421-2*b* of the diaphragm 402-2*b* of the second loudspeaker 401-2*b*. The second radiating surfaces 422-1*b*, 422-2*b* are arranged similarly.

The magnetic units 410-1*b*, 410-2*b* are suspended from the frame. A respective voice coil 408-1*b*, 408-2*b* is rigidly attached to each of the diaphragms 402-1*b*, 402-2*b*.

The voice coil 408-1*b* is rigidly attached to the second radiating surface 422-1*b* of the diaphragm 402-1*b* of the first loudspeaker 401-1*b*. The diaphragm 402-1*b* has a coupler mounted on the second radiating surface 422-1*b* on which the voice coil 408-1*b* is mounted, with the axis of the voice coil 408-1*b* having an angle to the second radiating surface 422-1*b* of the diaphragm 402-1*b* at the coupler so as to align with the axis of rotation of the diaphragm 402-1*b*. This shows that the drive unit does not have to be mounted perpendicular to the diaphragm. This can be useful to limit the required airgap width for reasons of drive unit (motor) efficiency. Note that an enlarged airgap is useful for silent operation however this is at the cost of motor efficiency. So for curved diaphragms it can be useful to do an analysis of the trajectory path at the voice coil location and optimize the angle of the voice coil and magnetic circuit accordingly.

The magnetic unit 410-2*b* of the diaphragm 402-2*b* of the second loudspeaker 401-2*b* is shaped along the path of the voice coil 408-2*b* as discussed with reference to FIG. 10B above. The magnetic unit 410-2*b* is suspended from the frame and the voice coil 408-2*b* is rigidly attached to the diaphragm 402-2*b* at a position along the diaphragm 402-2*b* which corresponds to a node in the second fundamental frequency of the diaphragm 402-2*b* as discussed above.

Both of the loudspeakers 401-1*b*, 401-2*b* illustrated in this example are Type 1 loudspeakers as discussed above with reference to FIGS. 5A and 5B. In this example, the diaphragms 402-1*b*, 402-2*b* are surrounded by a layer of material which extends from the frame 406*a* and has an open-cell or perforated structure (labelled Ob, noting that in this figure Ob is an extension of the frame structure that is perforated). A cavity 442-1*b*, 442-1*b* is formed between each diaphragm 402-1*b*, 402-2*b* and the Ob layer to provide each diaphragm 402-1*b*, 402-2*b* with sufficient space to vibrate. A layer of a material having an open-cell structure such as foam (labelled Fb) surrounds the Ob layer, and forms the shape of the headrest 400*b*. The entire headrest 400*b* structure is covered by a porous textile finishing layer (labelled Tb).

FIGS. 14C(i) and 14C(ii) show a third example headrest 400*c* incorporating two loudspeakers 401-1*c*, 401-2*c* according to the present disclosure.

In this example, the loudspeakers 401-1*c*, 401-2*c* each comprise a diaphragm 402-1*c*, 402-2*c* which is integrally formed from the frame Oc. The integral diaphragm is made from a closed cell foam e.g. EPP that is embedded around support 433*c* while the perforated plastic frame Oc surrounds the integral diaphragm to allow excursion and to provide a strong structure defining the shape of the headrest that can be covered with open cell foam 406*c* and textile Tc.

As such, the first frame part 406-1*c* extends from a first side of the headrest support 433*c* in the rear portion 430*c* of the headrest 400*c*, to form the diaphragm 402-1*c* of the first loudspeaker 401-1*c*. A proximal region of the integrally formed diaphragm 402-1*c* curves in the length direction around a first side of the head of a user. A distal region of the integrally formed diaphragm 402-1*c* is linear provide approximately flat radiating surfaces 421-1*b*, 421-2*b*. The first radiating surface 421-1*b* extends along and is parallel to a first side of the head of the user.

The diaphragm 402-2*c* of the second loudspeaker 401-2*c* is formed similarly such that the first radiating surface 421-2*b* extends along and is parallel to a second side of the head of a user. The first radiating surface 421-1*c* of the diaphragm 402-1*c* of the first loudspeaker 401-1*c* is opposite to and is approximately parallel to the first radiating surface 421-2*c* of the diaphragm 402-2*c* of the second loudspeaker 401-2*c*.

A hinge 401-9*c*, 401-9*c* is provided between the frame 406*c* in the rear portion 430*c* of the headrest 400*c* and each integral diaphragm 402-1*c*, 402-2*c*. The hinge 401-9*c* is provided by a thinner, weakened region of the frame 406*c* located between the frame 406*c* in the rear portion 430*c* of the headrest 400*c* and each integral diaphragm 402-1*c*, 402-2*c*.

Therefore, in this example, the diaphragms 402-1*c*, 402-2*c* are both examples of a hinged diaphragm as discussed above with reference to FIG. 1C.

A magnetic unit 410-1*c*, 410-2*c* and a voice coil 408-1*c*, 408-2*c* are suspended from each of the diaphragms 402-1*c*, 402-2*c* by metal springs 425-1*c*, 425-2*c* at a position along each diaphragm 402-1*c*, 402-2*c* which corresponds to a node in the second fundamental frequency of the diaphragm 402-1*c*, 402-2*c* as discussed above.

The magnetic unit 410-1*c*, 410-2*c* and the voice coil 408-1*c*, 408-2*c* are suspended from the second radiating surface 422-1*c*, 422-2*c* of each diaphragm 402-1*c*, 402-2*c*. Alternatively, the magnetic unit 410-1*c*, 410-2*c* and the voice coil 408-1*c*, 408-2*c* may be suspended from the first radiating surface 421-1*c*, 421-2*c* of each diaphragm 402-1*c*, 402-2*c*. The magnetic unit 410-1*c* and the voice coil 408-1*c* of the first loudspeaker 401-1*c* are positioned opposite to the magnetic unit 410-2*c* and the voice coil 408-2*c* of the second loudspeaker 401-2*c*. Preferably two metal springs distant from each other are used to provide stable movement of the magnetic circuit; namely to prevent tilting of the magnetic circuit relative to the voice coil. Metal spirally shaped springs are well known as a replacement for traditional textile spiders which could also be used of course.

Therefore, both of the loudspeakers 401-1*c*, 401-2*c* illustrated in this example are Type 3 loudspeakers as discussed above with reference to FIGS. 7A and 7B. The frame 406*c* and each integral diaphragm 402-1*c*, 402-2*c*, is formed from a material having a closed-cell structure such as foam (labelled F1*c*) which conforms around the headrest support 433*c*. The frame Oc and each loudspeaker 401-1*c*, 401-2*c* is then surrounded by a layer of material having an open-cell or perforated structure (labelled 406*c*). A cavity 442-1*c*, 442-2*c* is formed between each diaphragm 402-1*c*, 402-2*c* and the Oc layer to provide each diaphragm 402-1*c*, 402-2*c* with sufficient space to vibrate. A layer of a second material having a open-cell structure such as foam (labelled F2*c*) surrounds the layer labelled Oc. The F1*c* (E.g. EPP) layer may be a different material to the F2*c* (Open cell) layer. The entire headrest 400*c* structure is covered by a porous textile finishing layer (labelled Tc).

FIGS. 14D(i) and 14D(ii) show a fourth example headrest 400*d* incorporating two loudspeakers 401-1*d*, 401-2*d* according to the present disclosure.

Here, the loudspeakers 401-1*d*, 401-2*d* each comprise a diaphragm 402-1*d*, 402-2*d* which is integrally formed from the headrest support 433*d* in the rear portion 430*d* of the headrest 400*d*.

In this example, the diaphragm 402-1*d* of the first loudspeaker 401-1*d* is linear and extends from a first side of the headrest support 433-1*c* at an angle of approximately 45° to the normal axis of the headrest support 433*c*.

Therefore, in contrast to all of the above examples, the diaphragm 402-1*d* of the first loudspeaker 401-1*d* does not extend approximately parallel to the first side of the head of a user sat in the seat. Instead the diaphragm 402-1*d* of the first loudspeaker 401-1*d* is positioned directly behind a first ear of a user sat in the seat such that the first radiating surface 421-1*d* of the diaphragm 402-1*d* extends approximately parallel to a first rear side of the head of the user, wherein a rear side of the head is located between the back of the head and a side of the head.

The diaphragm 402-2*d* of the second loudspeaker is arranged similarly. As such, the first radiating surfaces 421-1*d*, 421-2*d* of the diaphragms 402-1*d*, 402-2*d* are not parallel to each other, as is the case with the above examples.

In each loudspeaker 401-1$d$, 401-2$d$, a magnet unit 410-1$d$, 410-2$d$ and a voice coil 408-1$d$, 408-2$d$ are located on the second radiating surface 422-1$d$, 422-2$d$ of each diaphragm 402-1$d$, 402-2$d$ at a position along each diaphragm 402-1$d$, 402-2$d$ which corresponds to a node in the second fundamental frequency of the diaphragm 402-1$d$, 402-2$d$, as discussed above with reference to FIG. 3 above.

Therefore, both of the loudspeakers 401-1$d$, 401-2$d$ illustrated in this example are Type 1 loudspeakers as discussed above with reference to FIGS. 5A and 5B.

In this fourth example, the frame 406$d$ which attached to the support 433$d$ is formed from a material such as EPP, a closed cell foam. A closed cell foam such as EPP could provide enough structural strength to serve as a frame for the headrest while having very good properties towards crash impact on the head of a user. Closed cell foams are also used in helmets.

The headrest support 433$d$ and the loudspeakers 401-1$d$, 401-2$d$ are surrounded by the frame 406$d$ having multiple perforations 440$d$. A cavity 442-1$d$, 442-2$d$ is formed between each diaphragm 402-1$d$, 402-2$d$ and the layer of structural foam 406$d$ to provide each diaphragm 402-1$d$, 402-2$d$ with sufficient space to vibrate. The structural foam 406$d$ is surrounded by layer of material having an open-cell structure such as foam (labelled Fd). The entire headrest 400$d$ structure is covered by a porous textile finishing layer (labelled Td).

FIGS. 14E(i) and 14E(ii) show a fifth example headrest 400$e$ incorporating two loudspeakers 401-1$e$, 401-2$e$ according to the present disclosure.

As shown by FIG. 14E(i), the headrest 400$e$ comprises a headrest support 433$e$ that is trapezoidal shaped having a first long edge 434$e$ and a second long edge 435$e$ which are opposite and parallel to each other. The first long edge is longer 434$e$ than the second long edge 435$e$ and is closer to the head of a user sat in the chair. The headrest support 443$e$ further has a first short edge 436-1$e$ and a second short edge 436-1$e$ which are the same length, and are opposite to each other.

The loudspeaker 401-1$e$ comprises a frame (or a bracket) 406-1$e$ and a diaphragm 402-1$e$ connected to and extending from the first short edge 436-1$e$ of the headrest support 433$e$.

The frame 406-1$e$ extends from the first short edge 436-1$e$ of the headrest support 433$e$ at an angle of approximately 45° to a normal axis of the headrest support 433$e$. As such, the frame 406-1$e$ of the first loudspeaker 401-1$e$ is positioned directly behind a first ear of a user sat in the seat.

The frame 406-1$e$ includes a tuned corrugation 447-1$e$ (discussed with reference to FIG. 6A above) approximately half way along the length of the frame 406-1$e$, for adjusting the resonance frequency of the magnet circuit. Here, the resonance frequency of the mass of the magnet circuit together with the compliance 447-1$e$ is preferably tuned below the audio operation bandwidth of the device while a stimulus of this resonance frequency could be used to generate alerting mechanical vibrations, as described above.

A side of the proximal region of the diaphragm 402-1$e$ is rigidly *attached to the first short edge 436-1$e$ of the headrest support 433$e$.

The diaphragm 402-1$e$ comprises three components; a first linear portion, a second linear portion and a curved portion which joins together the first and second linear portions. The diaphragm 402-1$e$ initially extends parallel to the first short edge 436-1$e$ and the frame 406-1$e$ such that the first linear portion of the diaphragm 402-1$e$ is positioned directly behind a first ear of a user sat in the seat. As such a first portion of the first radiating surface 421-1$e$ of the diaphragm 402-1$e$ extends approximately parallel to a first rear side of the head of the user.

The diaphragm 402-1$e$ then extends beyond a distal end of the frame 406-1$e$ and, at this point, the diaphragm 402-1$e$ curves in a length direction to bring the second linear portion of the diaphragm 402-1$e$ along a first side of the head of a user. As such a second portion of the first radiating surface 421-1$e$ of the diaphragm 402-1$e$ extends approximately parallel to the first side of the head of a user. A few ribs in the curvature could be used to stiffen the diaphragm towards a desired performance.

A voice coil 408-1$e$ is suspended from the second radiating surface 422-1$e$ of the diaphragm 402-1$e$, at a position along the first linear portion of the diaphragm 402-1$e$ that is close to the curved portion of the diaphragm 402-1$e$. A magnet unit 410-1$e$ is suspended from the frame 406-1$e$ opposite the voice coil 408-1$e$ of the diaphragm 402-1$e$.

At the distal end of each diaphragm 408-1$e$, 408-2$e$ is a mid-high frequency unit 445-1$e$ suitable for accompanying a dipole woofer or subwoofer.

The frame 406$e$ and the diaphragm 402-1$e$ are surrounded by a layer of material having an open-cell or perforated structure (labelled Oe). Here Oe is also a frame extending from 433$e$ and 434$e$ and is actually a perforated plastic shell. A cavity 442-1$e$ is formed between the diaphragm 402-1$e$ and the Oe layer to provide the diaphragm 402-1$e$ with sufficient space to vibrate. A layer of a material having a open-cell structure such as foam (labelled Fe) surrounds the Oe layer. The entire structure is covered by a porous textile finishing layer (labelled Te).

The second loudspeaker 401-2$e$ has corresponding features which are arranged similarly to those of the first loudspeaker 401-1$e$. As such, the second portion of the first radiating surface 421-1$e$ of the diaphragm 402-1$e$ of the first loudspeaker 401-1$e$ is approximately parallel to the corresponding second portion of the first radiating surface 421-2$e$ of the diaphragm 402-2$e$ of the second loudspeaker 401-2$e$.

Therefore, both of the loudspeakers 401-1$e$, 401-2$e$ of this example are Type 1 loudspeakers as discussed above with reference to FIGS. 5A and 5B, In this example, the headrest support 433$e$ includes features for altering the position of the headrest 400$e$ such as motorized height and angle setting. Here the two circular components represent two magnetic units, one for each diaphragm. Of course, one could choose to energize a single diaphragm with more than one motor.

Experiment

Figure 15A:
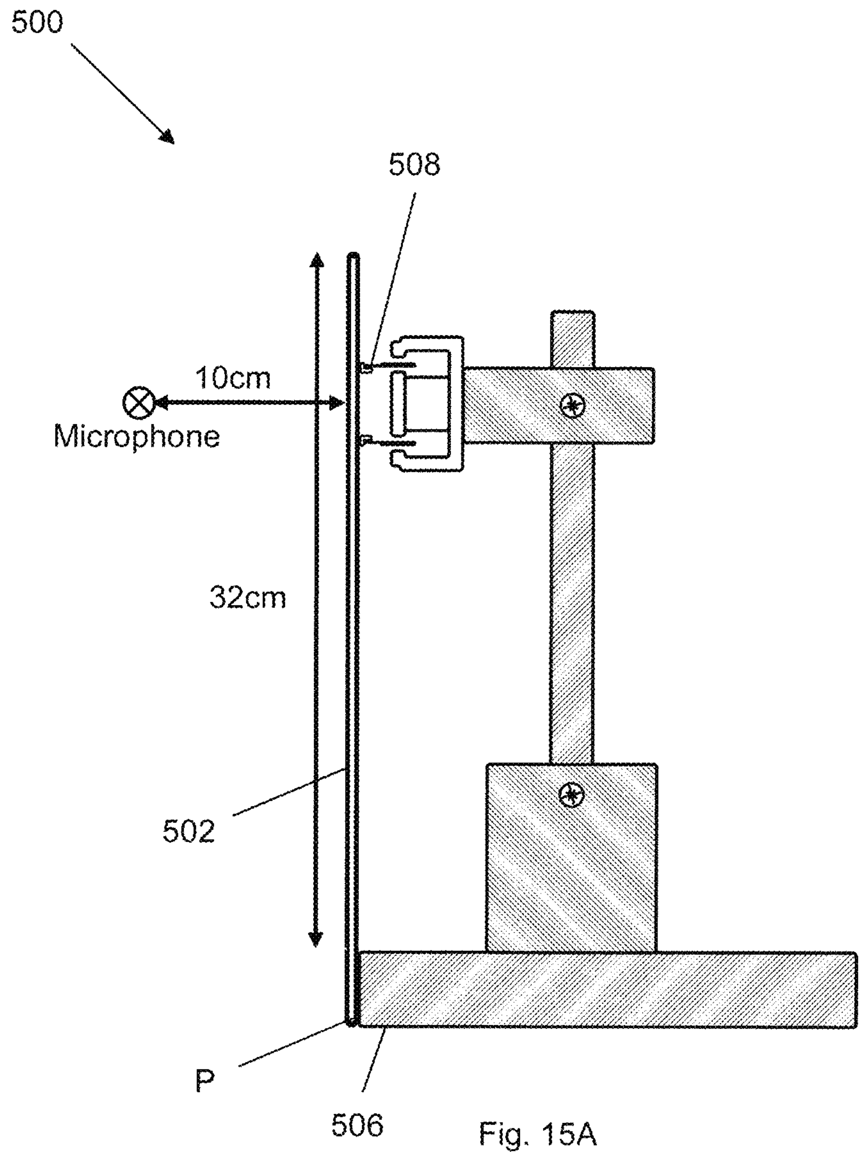
FIG. 15 shows A) an experimental apparatus (500) and B), C) experimental data obtained using the experimental apparatus of FIG. 15A.
Figure 15B:
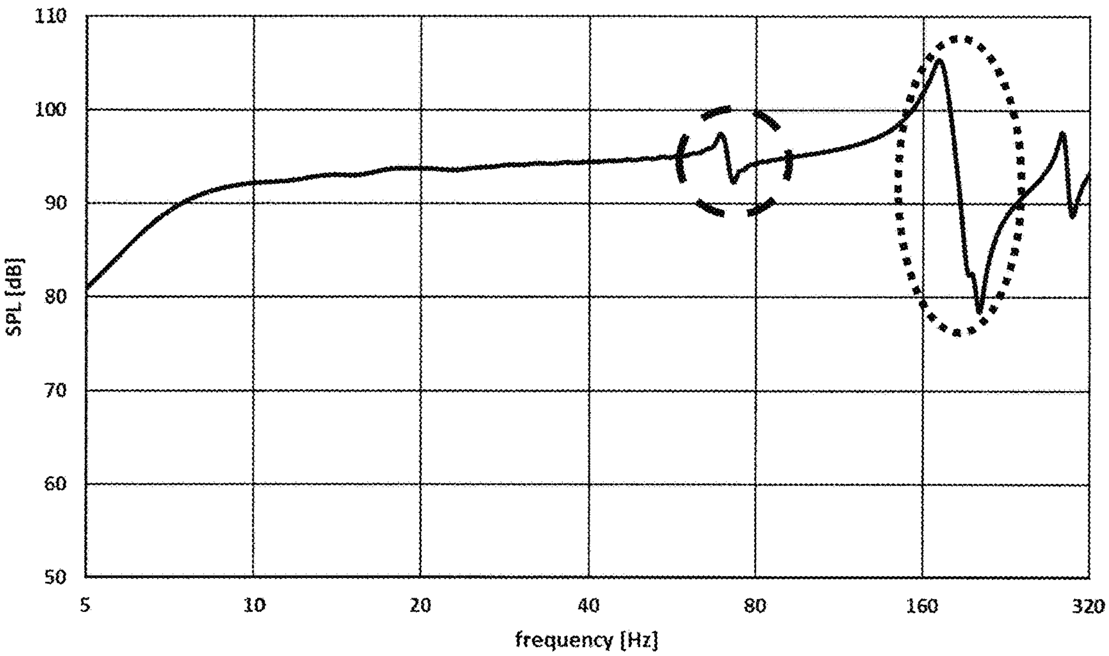
Figure 15C:
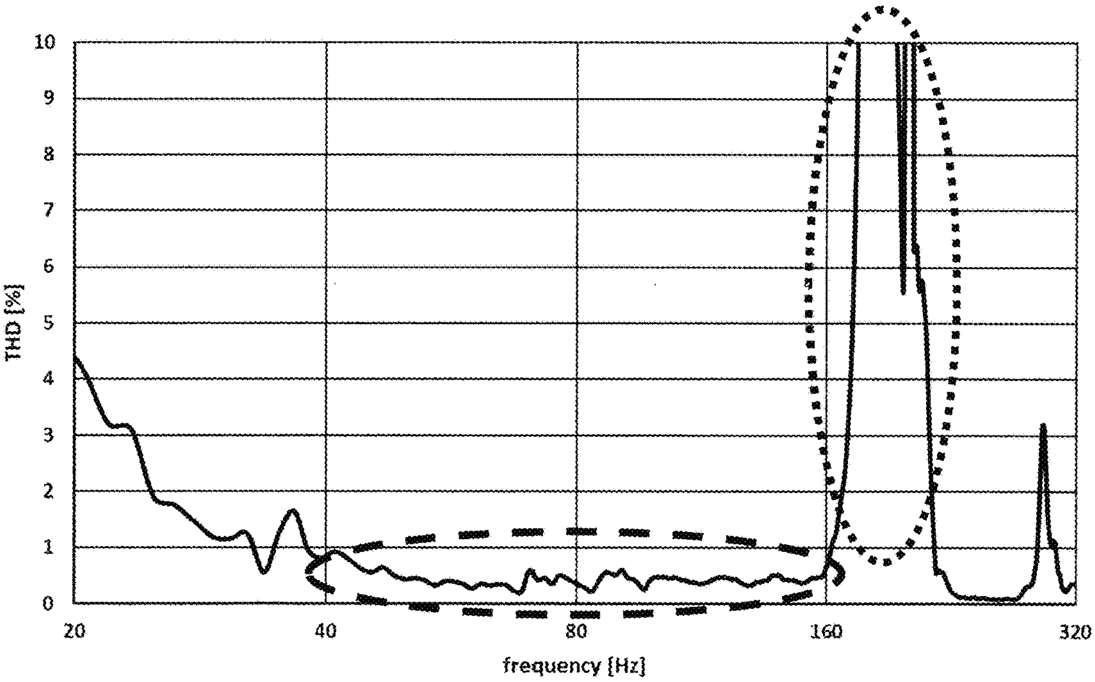

FIG. 15A shows an experimental apparatus 500. FIGS. 15B and 15C show experimental data obtained using the experimental apparatus 500 of FIG. 15A.

As shown, the experimental apparatus 500 includes a cantilever diaphragm 502 fixed at a proximal end P to a base 506. The voice coil 508 is positioned at 25 cm from the base 506, which is 0.78 the length of the diaphragm 502 (32 cm), i.e. at a location on the diaphragm 502 that corresponds to a node 10 in the second fundamental frequency of the diaphragm 502 (see discussion of FIG. 3, above).

In this example, the diaphragm parameters are as follows:

Composite material [phenolic paper skins with phenolic paper honeycomb structure as a filler]

E=2.4 GPa [Youngs modulus]

$\rho$=200 kg/m$^3$ [Density]

t=0,002 m [Thickness]

l=0.32 m [Length]

The drive unit parameters are as follows:

Re=7.4Ω [electrical voice coil resistance at DC (0 Hz)]

Bl=4.9 Tm [Motor force factor]

According to equation (1) above, the frequency (f1) of the fundamental mode of the diaphragm 502 of the experimental apparatus 500 (the fundamental diaphragm mode) is 8.5 Hz including the voice coil 508 mass (11.0 Hz, without the voice coil 508 attached).

FIG. 15B shows SPL (sound pressure level) at 10 cm distance from the diaphragm 502 at rest and with 1 W input power.

FIG. 15C shows THD (total harmonic distortion) at 10 cm distance from the diaphragm 502 at rest and with 1 W input power.

The dashed lines in FIGS. 15B and 15C indicate that the second harmonic mode f2 (at around 71 Hz) is suppressed, and whilst it is still visible in the frequency response, its magnitude and distortion are adequately low such that the diaphragm 502 can be used at f2, and indeed across the bandwidth 10 Hz-160 Hz. The distortion between 40 Hz and 160 Hz, as indicated by the dashed line in FIG. 15C, is very low (<1%), which is a particularly useful range of reproduction for a subwoofer.

In contrast, the dotted lines in FIGS. 15B and 15C indicate that the third harmonic mode f3 (at around 185 Hz) is not suppressed and generates huge amounts of distortion such that the diaphragm 502 cannot be used at this frequency.

We note that the experimental data shows a very low fundamental resonance of 8.5 Hz which is not ideal for real life implementations of the disclosed technology.

In a normal loudspeaker the diaphragm suspension along with the damper suspension of the voice coil defines the total stiffness of the mobile system. This total stiffness can be tuned entirely separated from the properties of the diaphragm.

Since we do not require conventional suspension elements (roll suspensions, spiders etc.) which allow translational movement of the diaphragm, the diaphragm and the voice coil suspension stiffness are, for a Type 1 loudspeaker (such as the one used in this experimental apparatus) entirely defined by the material properties and dimensioning of the diaphragm and are thus directly related to its fundamental resonance f1 as defined using equation (1)

In order for the diaphragm to have adequate "restoring force" for our voice coil interacting with a magnet unit, the stiffness of the diaphragm should be adequately high (a lack of restoring force will cause the voice coil to drift away from its center position relative to the magnetic circuit). However, since one of the few parameters we can vary to achieve this is the frequency of the fundamental mode (f1), we must find a compromise between bandwidth and stiffness for this Type 1 loudspeaker, i.e. a compromise that sets f1 to be high enough to give a large bandwidth and an adequate restoring force, yet low enough to provide coverage at the low end of the frequency range over which the loudspeaker is to perform (which might be in the range 20 Hz-40 Hz for a typical subwoofer).

Ideally f1 is high for voice coil restoring force but lower than the lowest frequency in the chosen operation bandwidth.

Preferably f1 is situated between 20 Hz and 40 Hz. E.g. F1=30 Hz will allow a bandwidth of 30 Hz-500 Hz if we drive the diaphragm at the node of the second mode f2.

Additional Remarks

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of documents, including patent applications, are cited above in order to more fully describe and disclose the invention and the state of the art to which the invention pertains. Full citations for these references are provided below. The entirety of each of these references is incorporated herein.

PCT/EP2018/084636
PCT/EP2019/056109
PCT/EP2019/056352

The invention claimed is:

1. A loudspeaker for producing sound at bass frequencies including:

a diaphragm;

a frame, wherein a proximal end of the diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm, wherein the diaphragm has a plurality of harmonic modes including a first harmonic mode and a second harmonic mode;

a drive unit configured to move the distal end of the diaphragm based on an electrical signal;

wherein the drive unit is configured to apply force to the diaphragm at a location on the diaphragm that corresponds to a node in the second harmonic mode of the diaphragm.

2. A loudspeaker according to claim 1, wherein the at least one proximal suspension element is configured to prevent rotation of the proximal end of the diaphragm.

3. A loudspeaker according to claim 1, wherein the at least one proximal suspension element is configured to permit rotation of the proximal end of the diaphragm.

4. A loudspeaker according to claim 1, wherein the distal end of the diaphragm is suspended from the frame by at least one distal suspension element, wherein the at least one distal suspension element is configured to permit translational movement of a distal end of the diaphragm.

5. A loudspeaker according to claim 1, wherein the loudspeaker is a subwoofer configured to produce sound at bass frequencies, wherein the bass frequencies include frequencies across the range 50-100 Hz.

6. A loudspeaker according to claim 1, wherein the diaphragm is a primary diaphragm, wherein a secondary diaphragm is suspended from the primary diaphragm by one or more secondary suspension elements, and wherein the drive unit is configured to move the distal end of the diaphragm by applying force at the secondary diaphragm.

7. A loudspeaker according to claim 6, wherein the loudspeaker is configured to produce sound over a frequency range that includes frequencies across the range 50 Hz-500 Hz.

8. A loudspeaker according to claim 1, wherein a magnet unit of the drive unit is suspended from the frame by at least one magnet unit suspension element, wherein the at least one magnet unit suspension element is preferably configured to provide a predetermined level of attenuation on vibrations produced by the drive unit before those vibrations reach the frame.

9. A loudspeaker according to claim 1, wherein a magnet unit of the drive unit is suspended from the diaphragm via at least one magnet unit suspension element.

10. A seat assembly including:

a seat; and a loudspeaker for producing sound at bass frequencies;

wherein the loudspeaker includes:

a diaphragm;

a frame, wherein a proximal end of the diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm;

a drive unit configured to move the distal end of the diaphragm based on an electrical signal;

wherein the seat is configured to position a user who is sat down in the seat such that an ear of the user is located at a listening position that is in front of and 50 cm or less from the first radiating surface of the diaphragm.

11. A seat assembly according to claim 10, wherein a headrest of the seat includes a wing portion configured to extend at least partially along a side of a head of a user sat in the seat, when the seat is in use, wherein the diaphragm extends at least partially into the wing portion, with the distal end of the diaphragm located in the wing portion.

12. A seat assembly according to claim 10, wherein:

a headrest includes two loudspeakers, wherein the two loudspeakers each include:

a diaphragm;

a frame, wherein a proximal end of the diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm; and a drive unit configured to move the distal end of the diaphragm based on an electrical signal;

wherein the seat is configured to position a user who is sat down in the seat such that a first ear of the user is located at a listening position that is in front of and 50 cm or less from the first radiating surface of the diaphragm of a first of the two loudspeakers, and such that a second ear of the user is located at a listening position that is in front of and 50 cm or less from the first radiating surface of the diaphragm of a second of the two loudspeakers.

13. A seat assembly according to claim 10, wherein the seat has a rigid seat frame, and the frame of the loudspeaker is part of or fixedly attached to the rigid seat frame.

14. A seat assembly according to claim 10, wherein the diaphragm has a plurality of harmonic modes including a first harmonic mode and a second harmonic mode, wherein the drive unit is configured to apply force to the diaphragm at a location on the diaphragm that corresponds to a node in the second harmonic mode of the diaphragm.

* * * * *